United States Patent
Rawal

(10) Patent No.: US 9,745,130 B1
(45) Date of Patent: Aug. 29, 2017

(54) PICKUP LOCATIONS WITH MODIFIABLE STORAGE COMPARTMENT CONFIGURATIONS

(71) Applicant: Amazon Technologies, Inc., Seattle, WA (US)

(72) Inventor: Sagar Amrutlal Rawal, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 14/658,107

(22) Filed: Mar. 13, 2015

(51) Int. Cl.
*G06F 7/00* (2006.01)
*B65G 1/137* (2006.01)
*G06Q 10/08* (2012.01)

(52) U.S. Cl.
CPC ......... *B65G 1/137* (2013.01); *G06Q 10/0836* (2013.01)

(58) Field of Classification Search
USPC .......................................................... 700/216
See application file for complete search history.

(56) References Cited

U.S. PATENT DOCUMENTS

| | | |
|---|---|---|
| 4,865,248 A | 9/1989 | Barth |
| 5,386,462 A | 1/1995 | Schlamp |
| 6,344,796 B1 | 2/2002 | Ogilvie et al. |
| 6,426,699 B1 | 7/2002 | Porter |
| 6,690,997 B2 | 2/2004 | Rivalto |
| 6,694,217 B2 | 2/2004 | Bloom |
| 6,919,803 B2 | 7/2005 | Breed |
| 6,961,711 B1 | 11/2005 | Chee |
| 6,970,838 B1 | 11/2005 | Kamath et al. |
| 7,129,817 B2 | 10/2006 | Yamagishi |
| 7,133,743 B2 | 11/2006 | Tilles et al. |
| 7,188,513 B2 | 3/2007 | Wilson |
| 7,337,686 B2 | 3/2008 | Sagi-Dolev |

(Continued)

FOREIGN PATENT DOCUMENTS

| | | |
|---|---|---|
| JP | H03050802 U | 5/1991 |
| JP | H07093660 A | 4/1995 |

(Continued)

OTHER PUBLICATIONS

International Search Report of International Application No. PCT/US2015/015283 dated May 13, 2015.

(Continued)

*Primary Examiner* — Kyle Logan
(74) *Attorney, Agent, or Firm* — Athorus, PLLC

(57) ABSTRACT

Storage compartment configurations of pickup locations may be modified (e.g., by dividing larger storage compartments into multiple smaller storage compartments, or vice versa) based on sizes of items to be delivered to the pickup locations, so as to allow more items to be stored with less unused space in each of the storage compartments. Partitions may be positioned (e.g., inserted, moved, removed, etc.) utilizing positioning elements (e.g., rollers, motors, actuators, robotic arms, etc.) for configuring the sizes of each of the storage compartments. Door operations for each of the storage compartments may be modified so as to correspond to the current sizes of the storage compartments, and in some instances multiple doors may be utilized for providing access to larger storage compartments while individual doors may be utilized for providing access to smaller storage compartments.

20 Claims, 10 Drawing Sheets

(56) References Cited

U.S. PATENT DOCUMENTS

| | | |
|---|---|---|
| 7,337,944 B2 | 3/2008 | Devar |
| 7,693,745 B1 | 4/2010 | Pomerantz et al. |
| 7,925,375 B2 | 4/2011 | Schininger et al. |
| 8,015,023 B1 | 9/2011 | Lee et al. |
| 8,078,317 B2 | 12/2011 | Allinson et al. |
| 8,131,607 B2 | 3/2012 | Park et al. |
| 8,145,351 B2 | 3/2012 | Schininger et al. |
| 8,195,328 B2 | 6/2012 | Mallett et al. |
| 2001/0045449 A1 | 11/2001 | Shannon |
| 2002/0016726 A1 | 2/2002 | Ross |
| 2002/0087375 A1 | 7/2002 | Griffin et al. |
| 2002/0111914 A1 | 8/2002 | Terada et al. |
| 2002/0116289 A1 | 8/2002 | Yang |
| 2003/0040980 A1 | 2/2003 | Nakajima et al. |
| 2007/0073552 A1 | 3/2007 | Hileman |
| 2007/0170237 A1 | 7/2007 | Neff |
| 2009/0063166 A1 | 3/2009 | Palmer |
| 2009/0106124 A1 | 4/2009 | Yang |
| 2009/0149985 A1* | 6/2009 | Chirnomas .......... B65G 1/1373 700/215 |
| 2009/0299903 A1 | 12/2009 | Hung et al. |
| 2012/0039694 A1 | 2/2012 | Suzanne |
| 2012/0109419 A1 | 5/2012 | Mercado |
| 2013/0148123 A1 | 6/2013 | Hayashi |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1* | 10/2013 | Kim .................... G07F 17/12 232/24 |
| 2014/0030444 A1 | 1/2014 | Swaminathan et al. |
| 2014/0052661 A1 | 2/2014 | Shakes et al. |
| 2015/0120602 A1* | 4/2015 | Huffman .............. G06Q 10/083 705/339 |
| 2015/0227882 A1 | 8/2015 | Bhatt |

FOREIGN PATENT DOCUMENTS

| | | |
|---|---|---|
| JP | 3027199 U | 7/1996 |
| JP | 2003058790 | 2/2003 |
| JP | 2007537546 | 12/2007 |
| JP | 2011505644 | 2/2011 |
| WO | 2006083268 A1 | 8/2006 |
| WO | 2009073338 A2 | 6/2009 |
| WO | 2013055867 A1 | 4/2013 |
| WO | 2013148123 A1 | 10/2013 |

OTHER PUBLICATIONS

Office Action for Japanese Patent Application No. 2015-231336 dated Jan. 30, 2017.

* cited by examiner

PICKUP LOCATIONS WITH MODIFIABLE STORAGE COMPARTMENT CONFIGURATIONS

BACKGROUND

Many companies package items and/or groups of items together for a variety of purposes, such as e-commerce and mail-order companies that package items (e.g., books, CDs, apparel, food, etc.) to be shipped to fulfill orders from customers. Retailers, wholesalers, and other product distributors (which may collectively be referred to as distributors) typically maintain an inventory of various items that may be ordered by customers. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

In some instances, a customer may order an item and designate a pickup location as the delivery location. A pickup location may include a control station and storage compartments where the items that are ordered from a materials handling facility can be delivered for pickup by customers. Rather than shipping the item to a residence or place of business, the item may be shipped to the pickup location and stored in a storage compartment for retrieval by the customer. For various reasons (e.g., holiday shopping, popular locations, etc.) there may at various times be a high demand for having items shipped to a pickup location. As a result, the pickup location may reach a maximum capacity wherein there are no more storage compartments available for receiving additional items.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
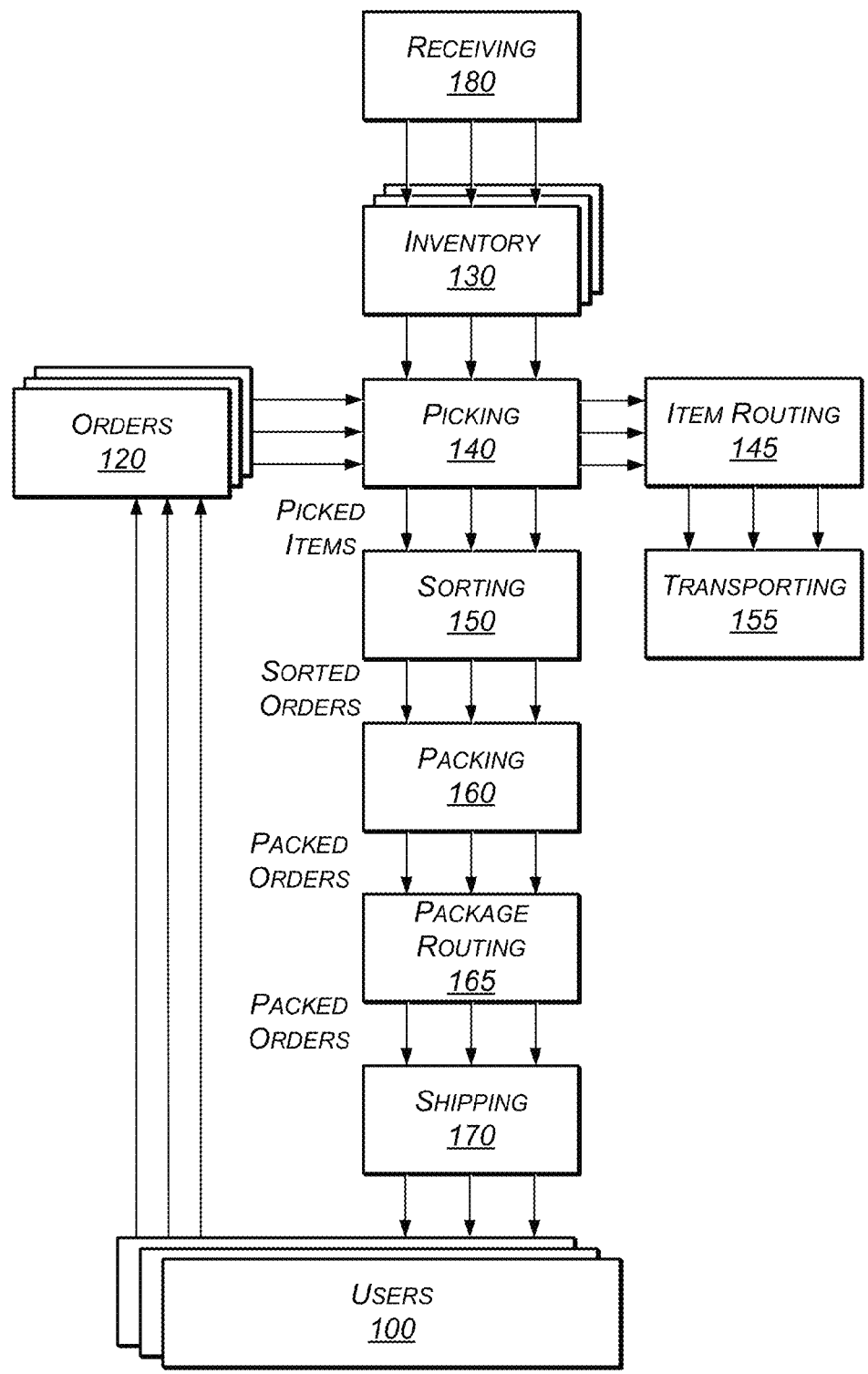
FIG. 1 illustrates a broad view of the operation of a materials handling facility, according to some implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

This disclosure describes systems and methods for pickup locations with modifiable storage compartment configurations. In various implementations, modifications may be performed based on evaluations of sizes of items that are to be stored in the pickup location. For example, items that are scheduled for delivery to a pickup location may be evaluated to determine a storage compartment configuration that will best store the items with the highest storage density and a least amount of unused space in each storage compartment. In one implementation, an optimal sorting algorithm may be utilized for determining the most efficient storage compartment configuration for storing the items.

In various implementations, the storage compartment configurations may be modified through a positioning of partitions. For example, partitions may be inserted in locations so as to divide larger storage compartments into smaller storage compartments. As another example, partitions in existing storage compartments may be moved to new locations so as to change the sizes of the storage compartments that are separated by the partitions. In various implementations, the partitions may be positioned through the utilization of partition positioning elements (e.g., electronically controlled rollers, gears, motors, actuators, robotic arms, etc.). In various implementations, as part of the positioning process, partition guiding portions (e.g., slots, tracks, rails, grooves, pins, ledges, etc.) may be utilized for guiding and/or securing the partitions as they are moved to their new locations.

Modified door operations may be determined which correspond to modified storage compartment configurations. In various implementations, fixed doors (e.g., on hinges) may be utilized wherein multiple doors may be opened to provide access to larger storage compartments, and individual doors may be opened to provide access to smaller storage compartments. Larger doors may also be made to include multiple smaller doors, wherein the smaller doors provide access to smaller storage compartments (e.g., as created by the insertion of partitions). In various implementations, sliding doors may also or alternatively be utilized. For example, if a modification changes a size of a storage compartment, an amount of opening provided between two sliding doors may be modified so as to match the new size of the storage compartment.

In various implementations, the timing for when modifications are made to a storage compartment configuration may be based on various factors. For example, modifications may be scheduled to be performed when a pickup location is least utilized (e.g., in the middle of the night or when a pickup location is closed). In various implementations, modifications may be performed more frequently when there is a higher demand for the pickup location. For example, during a holiday shopping season, multiple modifications may be performed throughout a day in order to best utilize the available storage capacity of the pickup location. In various implementations, the timing for modifications may be based at least in part on the timing for deliveries and retrievals of items to and from the pickup location. For example, after an item is retrieved from a larger storage compartment, while the storage compartment is empty a modification may be made for dividing the larger storage compartment into smaller storage compartments, so that smaller items associated with different user orders that are in transit to the pickup location may be stored in the smaller storage compartments. In various implementations, the timing for modifications may be based at least in part on the timing for when data is received regarding items that are to be delivered to the pickup location. For example, data may be accumulated from an ordering system and provided a certain number of times per day (e.g., three times per day), in which case modifications may be made at or after the times when the data is received.

A block diagram of a materials handling facility, which, in one implementation, may be an order fulfillment facility configured to utilize various systems and methods described herein, is illustrated in FIG. 1. In this example, multiple users 100 may submit orders 120, where each order 120 specifies one or more items from inventory 130 to be shipped to the user or to another entity specified in the order. An order fulfillment facility typically includes a receiving operation 180 for receiving shipments of stock from various vendors and storing the received stock in inventory 130. To fulfill the orders 120, the item(s) specified in each order may be retrieved or "picked" from inventory 130 (which may also be referred to as stock storage) in the order fulfillment facility, as indicated by picking operation 140. In some implementations, the items of a user order may be divided into multiple shipment sets for fulfillment by a planning service before fulfillment instructions are generated (not shown). As used herein, the term "shipment set" may refer to a single item of a user's order, multiple items of a user's order, or all items of a user's order.

In some instances, when a user has selected a pickup location, such as the pickup location described below with respect to FIG. 2, as the delivery destination, the item(s) of one or more shipment sets may be picked at the picking operation 140 directly into delivery containers. A "delivery container," as used herein, may be any form of container used in transporting or handling items. For example, a delivery container may be a tote, pallet, bin, trailer, etc. Additionally, the delivery container may be segmented or otherwise include division points, permanent or movable, that enable separation of items within the delivery container. In some instances, items themselves, such as larger items (e.g., big screen televisions, desks, cabinets) may be considered and treated as delivery containers. The delivery container may also include a unique identifier, such as a bar code, QR code, unique number, etc. to enable tracking and identification of the delivery container and association of items placed in the delivery container. For example, during a picking operation, an agent within the materials handling facility may scan the bar code of the delivery container and scan a barcode or identifier of the picked item as the item is placed into the delivery container. Scanning of the delivery container and the picked item results in the item becoming associated with and tracked with the delivery container. In some implementations, for delivery containers that are segmented or otherwise include division points, those segments may each include a unique identifier (e.g., bar code), and as items are placed in the delivery container they may be associated with a specific location, or segment within the delivery container by scanning the identifier of that segment. Likewise, because items may not be packed in shipping packages, the packing slip typically included in a shipping package may be applied to the item (e.g., stickered to the item), printed out at the pickup location upon retrieval of the item, or otherwise made available to a user.

Regardless of the type of delivery container utilized, in some implementations, items for which a pickup location has been selected as the final delivery destination do not need to be packed in a shipping package and can be transported to the pickup location in the delivery container. In other instances, items that are pre-packaged or fragile items that need additional protection prior to transport may be picked and transported to a pickup location in a delivery container. In another implementation, items may be put in bags prior to placement in the delivery container and/or storage compartment to provide confidentiality of the ordered items. In addition, items from multiple shipment sets destined for the same pickup location may be picked into the same delivery container for transport. As delivery containers are filled, an item routing operation 145 may route the filled delivery containers to the appropriate transporting operation 155 for transport to the designated pickup location. The item routing operation 145 may be manual or automated. The item routing operation 145 may receive an indication of the pickup location to which each item should be routed from a shipment planning system and route delivery containers to one or more transporting operations 155, from which they may be transported to the pickup location.

In other examples, for items not scheduled for delivery to a pickup location, or for items scheduled for delivery to a pickup location through other shipping methods, picked items may be delivered to one or more stations in the order fulfillment facility for sorting 150 into their respective shipment sets and for packing 160 in shipping packages. A package routing operation 165 may sort orders for packing in shipping packages to one or more shipping operations 170, from which they may be shipped to the users 100. The package routing operation 165 may in various implementations be automated or manual. The package routing operation 165 may receive an indication of the destination to which each packed shipment set should be routed from a central control system. In some instances, the destination may be the final destination identified by the user or a pickup location at which transfer of a shipment set may occur for final delivery to the user. The package routing operation 165 may also determine a routing destination for each packed shipment set dependent on the size of a shipping package in which the shipment set is contained and/or based on whether the shipment set will be delivered directly to the user or be delivered to a pickup location at which transfer of the shipment set will occur for final delivery to the user.

The arrangement and order of operations illustrated by FIG. 1 is merely one example of many possible implementations of the operation of a materials handling facility, such as an order fulfillment facility, that enables transport of items to pickup locations. Other types of materials handling, manufacturing, or order fulfillment facilities may include different, fewer, or additional operations and resources, according to different implementations.

As will be described in more detail below, the sizes of items that are scheduled for delivery to a pickup location may be utilized to determine whether a modification will be made to a storage compartment configuration at the pickup location. In various implementations, the sizes of the items that are utilized for such calculations may be based on the sizes of the items without shipping packages. As noted above, items for which a pickup location has been designated as the final delivery destination may not need to be packed in a shipping package. In such instances, the items may arrive at the pickup location and be placed in the designated storage compartments without requiring the items to be de-boxed or otherwise removed from a shipping package. In other instances, when an item is delivered to a pickup location in a shipping package, the item may be removed from the shipping package manually or automatically (e.g., utilizing robotic mechanisms, etc.) before the item is placed in the storage compartment of the pickup location. Alternatively, the size of the item that is utilized for the storage compartment calculations may be based on the size of a shipping package, in which case the item may not need to be removed from the shipping package before the shipping package is placed in the storage compartment of the pickup location. Various examples of storage compartments for storing items at a pickup location will be described in more detail below with respect to FIG. 2.

Figure 2:
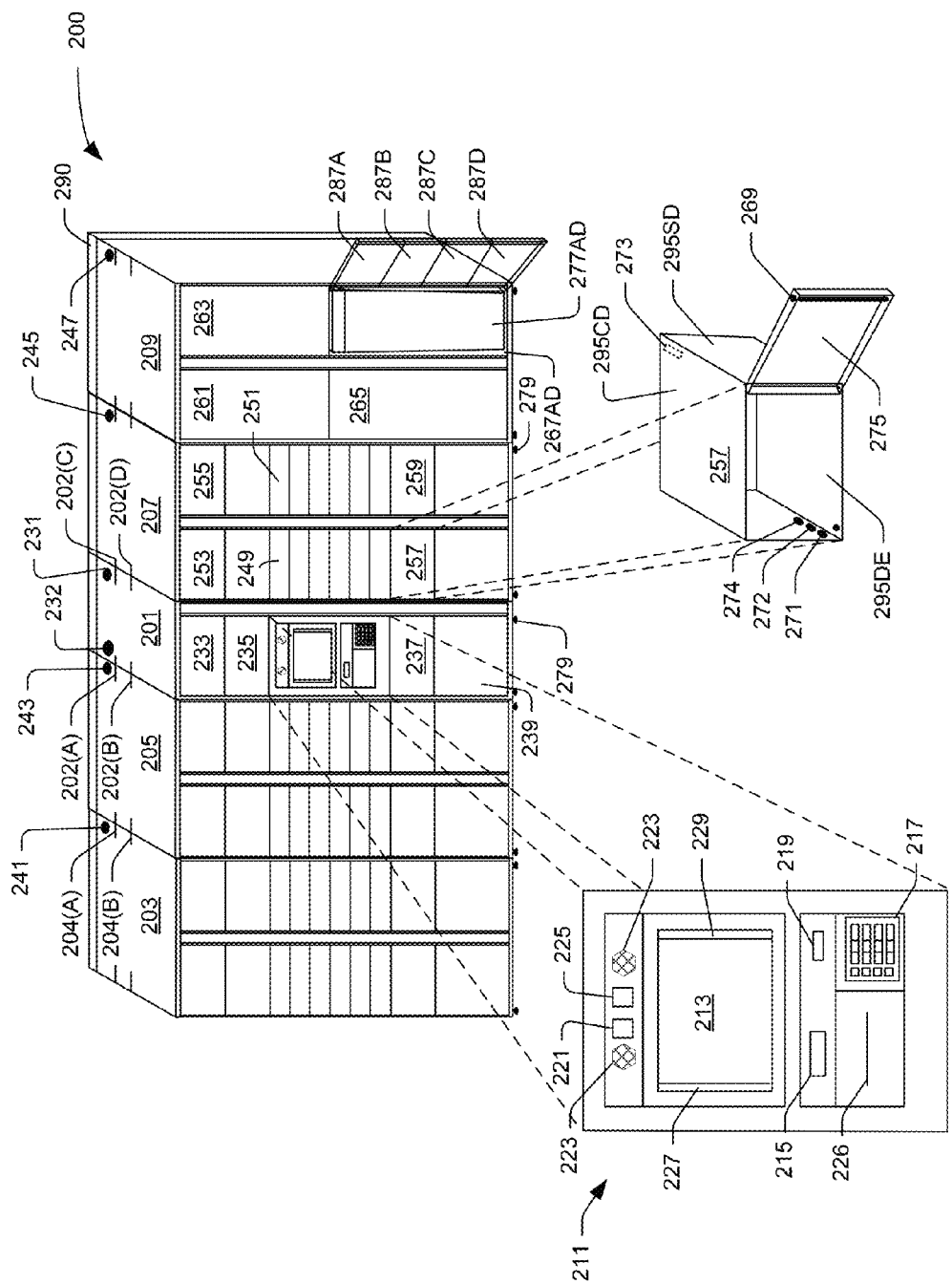
FIG. 2 is a schematic diagram of a pickup location, according to some implementations.
Figure 4:
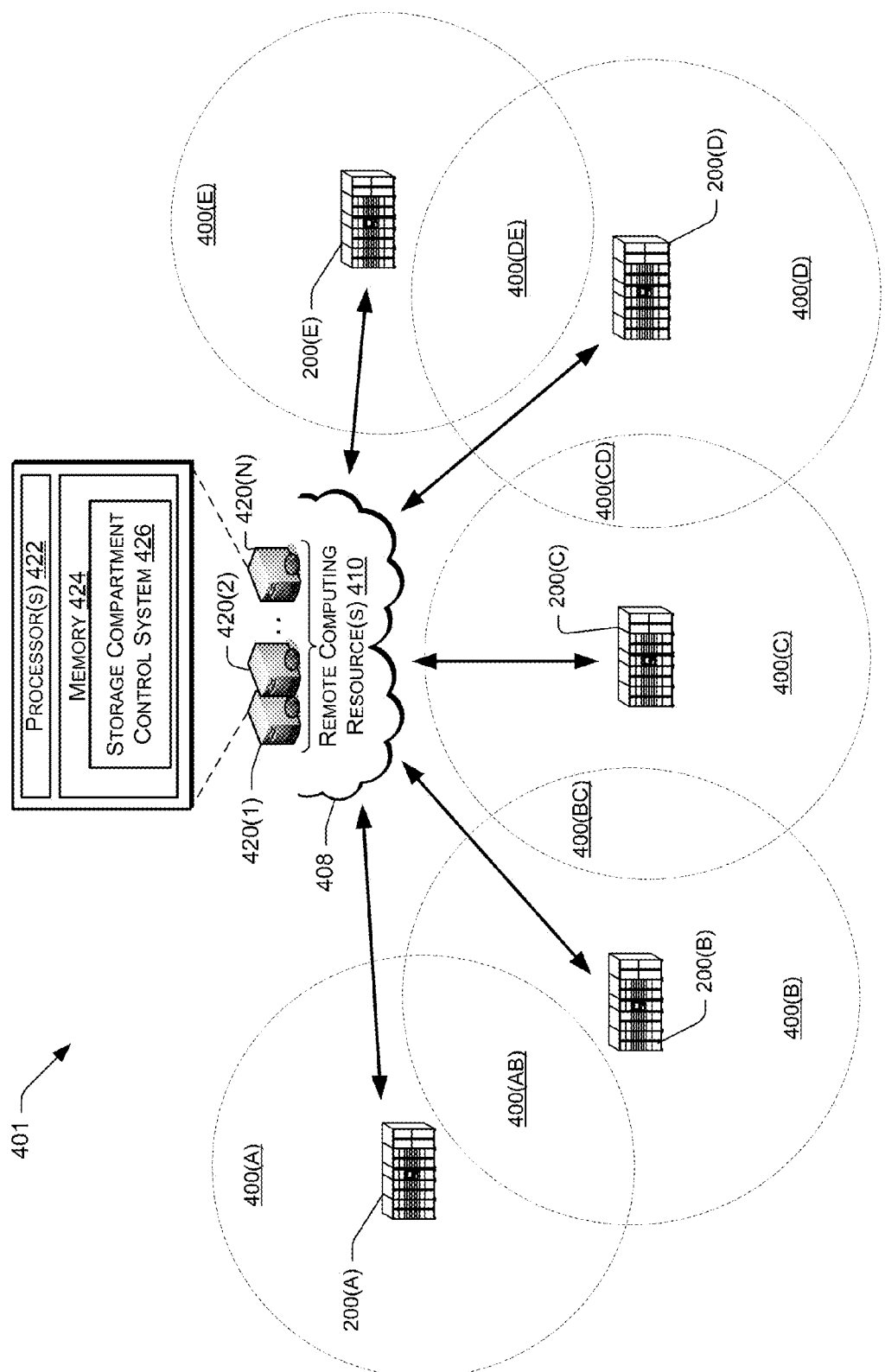
FIG. 4 is a block diagram of an illustrative distributed pickup location environment, according to some implementations.

FIG. 2 depicts a schematic diagram of a pickup location 200, in one implementation. The pickup location 200 may include one or more control stations 201 and one or more storage compartment modules 203, 205, 207, 209. The control station 201 acts as the central control point for the pickup location 200, providing power, computing resources, user input and network access to the pickup location 200. For example, control station 201 may include an internal computing system (not shown), such as a computing system described below with respect to FIG. 10, or other computing system, that is capable of maintaining state information for each storage compartment at the pickup location 200 and providing other computing functions. For example, the internal computing system may include a command component that maintains information as to which storage compartments of the pickup location 200 are empty, which storage compartments include items, the access code(s) or other identifier(s) necessary to open each of the storage compartments and any other information necessary to maintain the pickup location. The command component may also issue commands or instructions to the storage compartment modules to lock/unlock storage compartments, activate sensors, and the like. The pickup location 200 may be configured to obtain information from a remote computing resource, shipment planning system, capacity planning system, storage compartment control system, or material handling facility or may be configured to operate primarily as a stand-alone unit, with limited external communication to provide capacity information and/or to receive/provide order/delivery/transfer information. FIG. 4, described below, illustrates an example of an environment in which a centralized control system is provided for remotely communicating with a group of geographically distributed pickup locations 200.

The control station 201 may also include a user interface 211. The user interface 211 is configured to receive and provide information to one or more users of the pickup location 200 and may include, but is not limited to, a display 213, such as a touch-screen display, a scanner 215, a keypad 217, a biometric scanner 219, an audio transducer 221, one or more speakers 223, one or more image capture devices 225, such as a video camera, and any other types of input or output devices that may support interaction between the pickup location 200 and one or more users. For example, the user interface 211 may also include a credit card reader, the ability to accept money (such as cash or coins) and/or the ability to vend items (e.g., stamps, labels, envelopes, shipping packages) using a vending slot 226. Providing the ability for the pickup location 200 to accept credit cards and/or money enables the delivery of orders to a storage compartment at the pickup location 200 for which the items are paid for at the time of pickup (e.g. cash on delivery). Likewise enabling vending of items, such as stamps or envelopes, supports the ability for users to utilize a pickup location to ship or deliver goods, as described in more detail below.

In addition to including user input and output devices, the user interface 211 may also include the ability to collect particulates, such as for use in detection of hazardous (e.g., explosives) or banned substances (e.g. drugs). In one implementation, the user interface 211 may include a particulate sensor that includes a forced air ejection component 227 and an air intake component 229. The air ejection component expels air from a left side of the display 213 while a user is interacting with or otherwise within a predetermined range of the display 213. Opposite the air ejection component 227, the air intake component 229 collects the ejected air and any particulates that are collected as the air passes over the display 213 and past the user's hand or fingers as they interact with the display 213. Collected particulates may be scanned or otherwise processed to determine if potentially hazardous or banned substances may be placed in a storage compartment using any known particulate testing technique. If particulates indicating the potential presence of hazardous or banned substances are detected, the control station 201 may determine to not open a storage compartment door, may alert the authorities, or take other protective actions (such as shutting down the pickup location or performing additional tests). For example, if the air intake component 229 detects gasoline vapor particulates in a pickup location, the control station 201 may contact the appropriate authorities (e.g., police, fire, etc.)

The control station 201 may also include a connector component configured to provide wired and/or wireless network connectivity with the other storage compartment modules 203, 205, 207, 209, as well as to remote computing devices (FIG. 4) or materials handling facilities. Wireless connectivity may be implemented using a wireless antenna 231, which may provide both receive and transmit functionality. Power and/or network communication with remote computing devices may be obtained from a main access point 232. In addition, in some implementations, the control station 201 may include one or more storage compartments 233, 235, 237, 239. As described in more detail below with respect to the storage compartment modules 203, 205, 207, 209, the storage compartments 233, 235, 237, 239 of the control station 201 may be of any size or configuration, and the storage compartment configuration may be modifiable (e.g., through the insertion or removal of partitions, etc.). As with each of the other storage compartments, the storage compartments 233, 235, 237, 239 of the control station 201 may include an automated locking mechanism, image capture device, a motion or presence detection mechanism, temperature sensor, etc. Alternatively, in some implementations one or more of the storage compartments may be utilized as an additional user interface. For example, storage compartment 239 may be removed and the space remaining may be utilized to provide a scale or other type of weight determination component to allow users to weigh items for shipment, determine the cost necessary to ship the item, and pay for shipping using the user interface 211.

The control station 201 may include one or more connector components 202(A), 202(B), 202(C), 202(D) to which a storage compartment module, such as storage compartment module 205 or storage compartment module 207 may connect with the control station 201. For example, connector component 202(A) may provide power to storage compartment module 205, connector component 202(B) may provide communication with storage compartment module 205, connector component 202(C) may provide power to storage compartment module 207 and connector component 202(D) may provide communication with storage compartment module 207. Likewise, the storage compartment modules may also include one or more connector components, such as connector components 204(A), 204(B) to provide power and connectivity to additional storage compartment modules, such as storage compartment module 203.

Each storage compartment module, such as storage compartment modules 203, 205, 207, 209, may be configured so the pickup location 200 is modular, such that one or more storage compartment modules can be easily removed or added to the control station 201 of the pickup location 200. The ability to add or remove storage compartment modules at a pickup location 200 supports the ability to easily and quickly expand or remove capacity so that the demand for that pickup location can be satisfied. For example, during a holiday shopping season, additional storage compartment modules may need to be added to the pickup location 200 to support the increased demand of items ordered by users. As storage compartment modules 203, 205, 207, 209 are added or removed from a pickup location 200, the control station 201 may inform a warehouse management system and/or a capacity planning system of the added or removed capacity.

Each storage compartment module 203, 205, 207, 209 includes one or more storage compartments, one or more receptor components for connecting with connector components of a control station 201 (or another storage compartment module) and one or more connector components for allowing other storage compartment modules to connect thereto, thereby providing power and/or connectivity with the control station 201. The storage compartments of each storage compartment module may be of varying sizes and number. As such, storage compartment modules with different storage compartment sizes can be added to a pickup location 200 to optimize the storage compartment configuration to match that of the sizes of items typically scheduled for delivery to the pickup location. In addition, for certain storage compartment modules, the storage compartment configuration may be modifiable such that the storage compartment sizes may be made to better correspond to the sizes of items currently scheduled for delivery to the pickup location.

Figure 10:
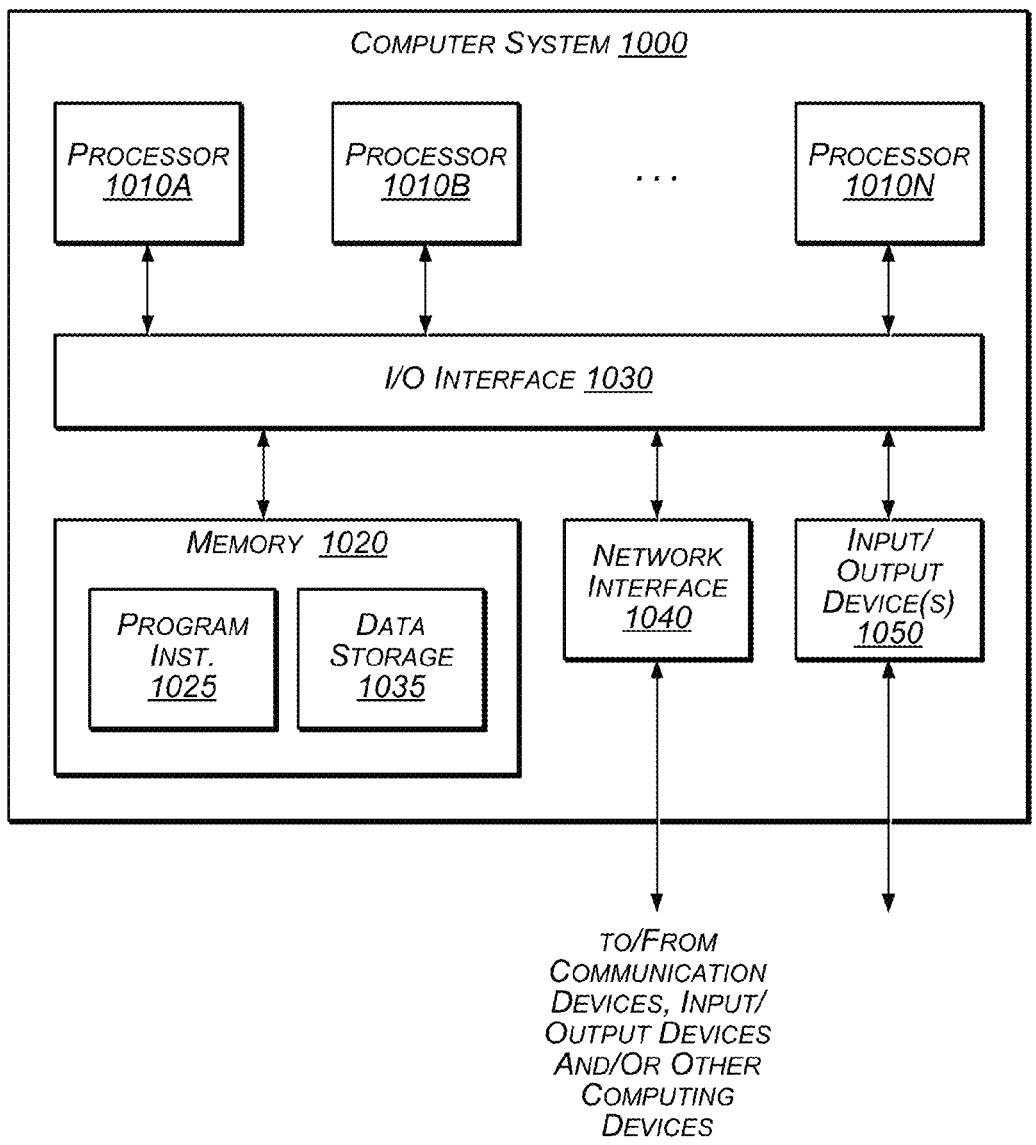
FIG. 10 is a block diagram illustrating an example computer system configured to implement one or more of the systems or processes described herein, in various implementations.

In addition to including storage compartments, power and connectivity points, the storage compartment modules 203, 205, 207, 209 may also include one or more wireless antennas 241, 243, 245, 247 and one or more computing systems, such as the computing system described with respect to FIG. 10, or a simpler computing system such as a printed circuit board, RFID tag, or anything else that may be detectable by the control station 201 and used to identify the storage compartment module. The computing component(s) of each storage compartment module may include a unique identifier of the storage compartment module and configuration information of the storage compartment module, which includes dimension information and location information of each storage compartment of the storage compartment module. The computing component may also include a storage compartment management component configured to control the actuators that enable locking and unlocking of the storage compartment doors of the storage compartment module 203, 205, 207, 209 in response to receiving commands or instructions from a command component of the control station 201.

A storage compartment module, such as storage compartment module 207, when added to a control station 201 and power is applied, provides information to the control station 201 identifying the storage compartment module 207, the number, location, and dimensions of each storage compartment of the storage compartment module and any other configuration or information necessary to enable the control station 201 to control the storage compartment module 207. As illustrated by the comparison between storage compartment module 207 and storage compartment module 209, each storage compartment module may have a variety of different storage compartment configurations, which may include different sizes and numbers of storage compartments. For example, storage compartment module 207 includes a group of small storage compartments, such as small storage compartments 249, 251, a group of larger storage compartments, such as storage compartments 253, 255, and a group of still-larger storage compartments, such as storage compartments 257, 259. In contrast, storage compartment module 209 is illustrated as including even larger storage compartments 261, 263, 265, 267AD, although as will be described in more detail below with respect to FIG. 3, the storage compartment configuration of the storage compartment module 209 may be modified through the placement of partitions to divide the storage compartment 267AD into smaller storage compartments. It will be appreciated that any number and size of storage compartments in a storage compartment configuration of a storage compartment module may be utilized with the various implementations described herein.

In an alternative implementation, rather than providing all of the information from the storage compartment module 207 to the control station 201, the storage compartment module 207 may only provide limited information, such an identifier, to the control station 201. The control station 201, upon receiving the limited information from an added storage compartment module 207, may make a request to a remote computing system, such as a storage compartment management system, and obtain information about the number and sizes of the storage compartments of the storage compartment configuration of the added storage compartment module 207.

The control station 201, upon receiving identifying information of an added storage compartment module 207, may allocate the added capacity to the pickup location 200, and may inform a remote computing resource such as will be described in more detail below with respect to FIG. 4. In various implementations, the added storage compartment module may act as a slave component for the control station, receiving instructions (e.g., open storage compartment, close storage compartment, position partitions, activate image capture device, monitor motion sensor) from the command component of the control station 201 and providing responses (e.g., closed-door, open-door, partitions positioned, object/movement detected) to the control station 201 via the storage compartment management component.

Each storage compartment of a storage compartment module 203, 205, 207, 209 or control station 201 includes an upper, bottom, side and rear surfaces and at least one door configured to form a cavity in which items may be stored. As will be described in more detail below, in various implementations partitions that are utilized to separate storage compartments may be inserted, removed, moved, etc. and may be utilized to form any of the upper, bottom, side or rear surfaces of the given storage compartments. In addition, each storage compartment may include various security or other components. For example, looking at the expanded view of storage compartment 257, disposed within the cavity the storage compartment may include a locking mechanism 269, which may be controlled remotely by the command component of the control station 201 via the storage compartment management component, a presence detection sensor 271, motion sensor 272, an image capture device 273, a temperature sensor 274, and a mirror (or other reflective surface) on the top inside of the storage compartment unit (not shown).

The locking mechanism 269 may be controlled by the control station 201, either through wired or wireless communication with the storage compartment management component, to effect locking and unlocking of the door 275 of the storage compartment 257. For example, when a user interacts with the control station 201 via the display 213 and provides an access code or other identifier, the control station 201 may identify a specific storage compartment associated with the access code or other identifier and the command component may wirelessly send instructions to the storage compartment management component of the storage compartment module 207 to unlock a storage compartment 257. The instructions may include a command (e.g., unlock), an address or identifier of the specific storage compartment and any other information necessary for communication between the control station 201 and the storage compartment module 207. In response to receiving the instructions from the command component, the storage compartment management component of the storage compartment module 207 may activate a locking mechanism that moves the pins of the locking mechanism 269 on the door 275 of the identified storage compartment 257 such that the pins retract, thereby disengaging the lock of the storage compartment 257 allowing the door 275 to open. In some implementations, the storage compartment 257 may also include a spring mechanism (not shown) such that when the locking mechanism 269 of the storage compartment 257 is disengaged, the spring mechanism propels the door 275 outward, thereby identifying to a user that the door 275 is unlocked and the storage compartment 257 is accessible.

While the locking mechanism described above utilizes retractable pins, any mechanical, magnetic, electrical or other form of locking mechanism may be utilized with the various implementations described herein. In addition, the storage compartment 257 may also include magnets to help retrieve and close a door when it is not all the way closed. Also, the locking mechanism of different storage compartments and different storage compartment modules may be the same or different. Moreover, while the above example describes sending instructions from the command component of the control station 201 to the storage compartment management component of the storage compartment module, in other implementations, each storage compartment may be controlled and/or communicated with directly by the control station 201 and/or the command component and/or remote computing resources as will be described in more detail below with respect to FIG. 4.

The presence detection sensor 271 may be used to detect the presence or absence of objects in the storage compartment 257. For example, the presence detection sensor 271 may be utilized when a carrier or user is placing items, delivery containers and/or transfer containers in the storage compartment 257 to confirm that the item is indeed in the storage compartment 257 before the door 275 is closed and locked by the locking mechanism 269. Additionally, the presence detection sensor 271 and/or motion sensor 272 may also be used when a user is picking up an order stored in the storage compartment 257 or when a carrier is removing items, delivery containers and/or transfer containers from the storage compartment 257. For example, when a user interacts with the control station 201 via the touch control display 213 and provides an access code such that a storage compartment 257 is opened, the presence detection sensor 271 and/or motion sensor 272 may be used to confirm that a user has reached into the storage compartment 257 and removed its contents (or added items in the case of returns or shipping), prior to allowing the storage compartment door 275 to be closed and locked with the locking mechanism 269. In some implementations, there may be multiple presence detection sensors 271 and/or motion sensors 272 distributed throughout the inside of a storage compartment to ensure objects/motion is detected. In still another implementation, the bottom of the storage compartment may include protrusions or rises to position thin items so they are detected by the presence detection sensor 271.

The storage compartments, such as storage compartment 257, may also include an image capture device 273, such as a camera, and optionally an illumination component (not shown), such as a light emitting diode (LED), that may be used to illuminate the inside of the storage compartment 257. The image capture device 273 may also be used to the detect presence or absence of items within the storage compartment 257, detect the item itself, for example to simplify returns, as well as for security. For example, the image capture device 273 may be used to identify the type of object located within the storage compartment 257 and/or to identify or record video/images of access with the storage compartment 257. In addition, the image capture device 273 may be used to determine the amount of space available in the storage compartment 257. For example, an image taken by the image capture device 273 may be transmitted via wired or wireless communication to the control station 201 and the control station 201 may determine the amount of space available in the storage compartment 257. Such information may be used to determine if all items of a shipment set will fit in a single storage compartment 257, if all items associated with a storage compartment are present in the storage compartment, if the shipment set needs to be divided across multiple storage compartments, or if the storage compartment configuration needs to be modified to provide more or less room in a storage compartment for the shipment set. In addition, as will be described in more detail below, an image capture device (e.g., similar to image capture device 273) may also be used to determine if there is sufficient space in a storage compartment 267AD to contain an item 277AD.

Some storage compartments, such as storage compartments located vertically higher within a storage compartment module 203, 205, 207, 209 or the control station 201, such as storage compartments 233, 235, 253, 255 may also include a reflective surface, such as a mirror, on the inside top, sides and/or back of the storage compartment to enable a user who cannot see directly into the storage compartment to determine via a reflection off the reflective surface whether they have removed all of the items from the storage compartment. In a similar manner, a reflective surface may be included on the bottom, sides or back of a storage compartment, such as storage compartment 239, located lower within a storage compartment module 203, 205, 207, 209 or the control station 201, so users can determine via a reflection, and without having to bend all the way down to see into the storage compartment, whether all items have been removed.

The image capture device 273 may also be used to determine if all of the items have been removed from the storage compartment 257. For example, a current image taken by the image capture device 273 may be compared to a prior image taken when the storage compartment 257 was empty in order to verify that all of the items have been removed from the storage compartment. In one implementation, the current image taken by the image capture device 273 may be transmitted via wired or wireless communication to the control station 201 and the control station 201 may compare the current image to a stored image of the empty storage compartment 257 using image processing software to determine if all of the items have been removed. For example, when a user closes the door of the storage compartment 257 after removing some items, the control station 201 may use the current image from the image capture device 273 to automatically detect and provide a warning to the user if there are items remaining in the storage compartment 257.

Various partitions may be utilized to form some or all of the surfaces of a storage compartment. With respect to the storage compartment 257, the upper surface is shown to be formed from a partition 295CD, the lower surface is shown to be formed from a partition 295DE and a side surface is shown to be formed from a partition 295SD. In various implementations, such partitions may be positioned (e.g., removed, inserted, moved, etc.) so as to modify a storage compartment configuration. For example, the storage compartment 257 may have been formed by inserting one or more of the partitions 295CD, 295DE and 295SD to divide an initially larger storage compartment into smaller storage compartments including the storage compartment 257. As will be described in more detail below with respect to FIG. 3, such partitions may be stored and/or positioned utilizing partition positioning elements that are included in a modification components area 290 (e.g., located on the back side of the storage compartment modules 203, 205, 207, 209 and the control station 201).

Some storage compartments, such as any of the storage compartments located within a storage compartment module 203, 205, 207, 209 or the control station 201, may be refrigerated storage compartments. In various implementations, such refrigerated storage compartments may include their own cooling mechanisms, or may rely on those of neighboring refrigerated storage compartments to which they are environmentally coupled, or alternatively each of the modules 201, 203, 205, 207, 209 or the entire pickup location 200 may have a centralized cooling system. The temperature of previously non-refrigerated storage compartments may be adjusted to become refrigerated storage compartments, and vice versa. The temperature in each of the refrigerated storage compartments may be separately adjustable, such that items inside each of the refrigerated storage compartments may be cooled to a desired temperature. For example, items that need to be chilled or frozen at specified temperatures, such as groceries or medical supplies, may be stored in various refrigerated storage compartments.

In various implementations, the temperatures in the refrigerated storage compartments may be adjusted when items are delivered to be placed in the refrigerated storage compartments, or may be adjusted in advance. For example, when a refrigerated item is scheduled to be delivered to a pickup location, the temperature of a refrigerated storage compartment may be adjusted to a temperature that is specified for the refrigerated item in advance so that the refrigerated storage compartment will be at the specified temperature when the item is delivered. In one implementation, the image capture device 273 may be used to capture an image of an item when it is delivered and/or placed in a storage compartment in order to try to determine an appropriate storage temperature for the item. For example, an item may have information on a label which identifies a storage temperature, such as "contents to be stored at 32 degrees F. or lower".

The temperatures in some or all of the refrigerated storage compartments may be controlled by the control station 201. Continuous monitoring and regulating of the temperatures of the refrigerated storage compartments in which such items are kept may be important for verifying the condition of the items. Temperature sensors, such as the temperature sensor 274 of the storage compartment 257, may be utilized for monitoring and regulating the temperature inside each of the refrigerated storage compartments. The refrigerated storage compartments and/or the entire pickup location 200 may be insulated to prevent the dissipation of the cooled air from the refrigerated storage compartments.

In various implementations, one or more of the refrigerated storage compartments may be insulated storage compartments which are cooled by passive cooling elements that are placed within the storage compartments. For example, rather than utilizing an active cooling system which may have components such as compressors and coils, some of the storage compartments may be cooled by passive cooling elements such as cold packs, frozen water bottles, etc. In one implementation, the passive cooling elements may be included in a shipping package with an item when it is shipped to the pickup location. In an alternative implementation, the passive cooling elements may already be at the pickup location and may be added to the insulated storage compartment with the item when it arrives. The number of passive cooling elements to be included with an item may be calculated based on a number of factors. For example, one factor may be an estimated maximum period of time that the item may remain in the storage compartment before it is retrieved by a user. Another factor may be the expected ambient temperature at the pickup location and/or during shipping to the pickup location. Other factors may include the size of the storage compartment, the size and number of items to be included in the storage compartment, etc. Various government regulations may also specify temperatures at which certain items are to be maintained. For example, various federal, state and/or municipal regulations may dictate requirements for storage temperatures for items as well as maximum periods of time that items may be stored at a given temperature. All of these factors may be included in a calculation of how many passive cooling elements should be included in an insulated storage compartment with an item, as well as a determination of a maximum period of time that the item may remain in the storage compartment.

In another example, the pickup location 200 may also include a storage compartment module configured as a drop-box (not shown). Rather than utilizing specific storage compartments of the pickup location 200 to store returned items and/or items for delivery, a storage compartment module configured as a drop-box may be utilized to securely store such items. For example, a drop-box may be configured with a pivoting door or tray that allows items to be placed in the drop-box but not retrieved without having additional access to the drop-box. In some examples, the pivoting door or other form of access may also be locked and access only provided in response to a user interacting with the user interface 211, such as selecting to return an item.

The storage compartment modules 203, 205, 207, 209 as well as the control station 201 may also include self-leveling feet 279 that may be used to level the storage compartment modules 203, 205, 207, 209 and/or control station 201 when located on uneven surfaces. In addition, the self-leveling feet 279 may also be adjusted so that a storage compartment module, such as storage compartment module 205, 207, can be positioned so it is flush and aligned with a control station 201 or another storage compartment module. As an alternative to self-leveling feet 279, any other type of support mechanism may be utilized with various implementations described herein for supporting the control station 201 or any storage compartment module 203, 205, 207, 209. Also, the control station 201 and one or more of the storage compartment modules 203, 205, 207, 209 may utilize different types of support mechanisms. For example, the control station 201 may utilize self-leveling feet while the storage compartment modules 203, 205, 207, 209 may utilize rolling casters or wheels. The casters/wheels may further enable the ease with which storage compartment modules may be added or removed from a control station 201, thereby allowing the easy addition/removal of capacity at the pickup location 200.

Figure 3:
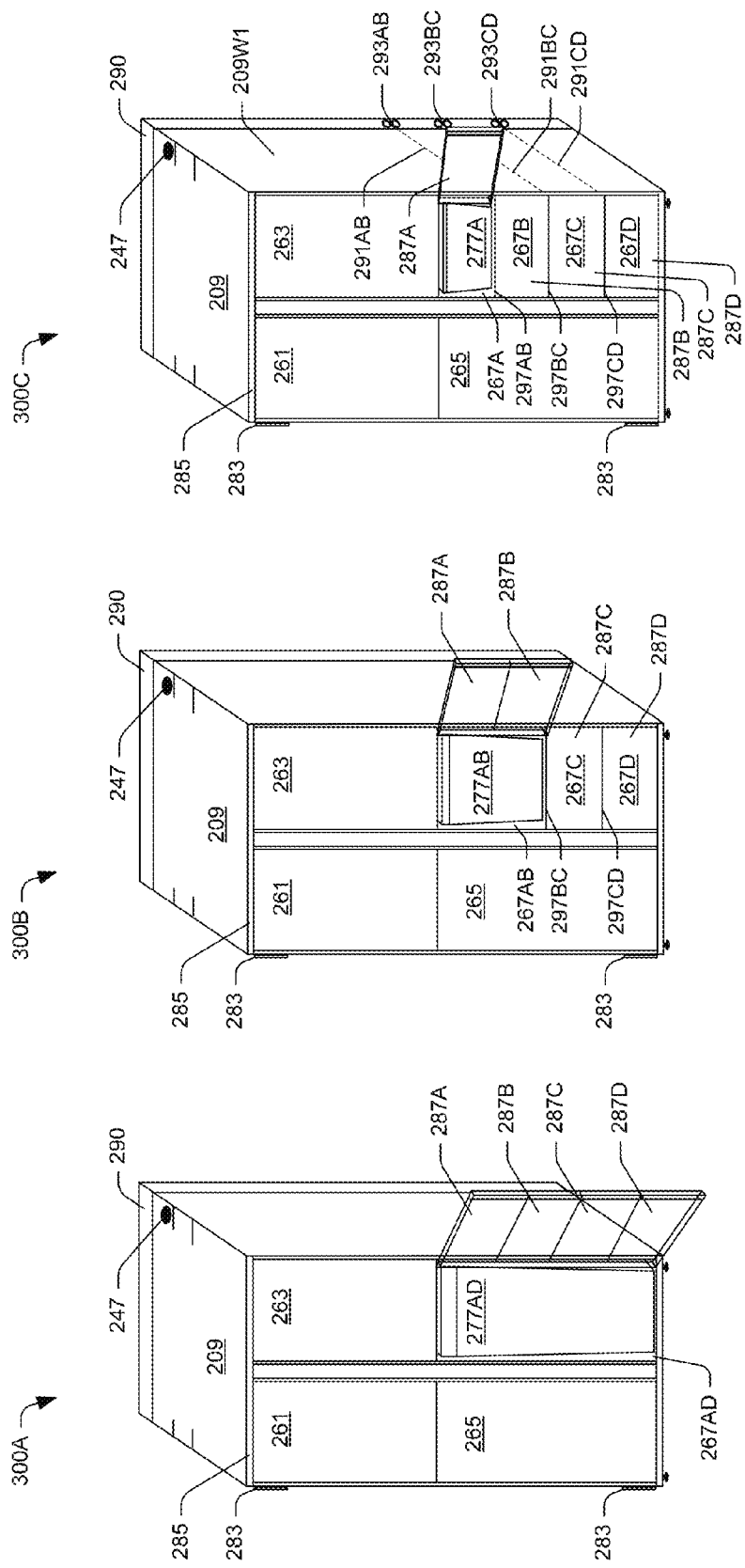
FIG. 3 is a schematic diagram of different example storage compartment configurations in a pickup location, according to some implementations.

FIG. 3 depicts a schematic diagram of example storage compartment configurations 300A-300C of the storage compartment module 209 of the pickup location 200. As shown in FIG. 3, in the first storage compartment configuration 300A, the storage compartment 267AD includes a large item 277AD, and is accessed through an opening of four doors 287A-287D. In various implementations, the doors 287A-287D may be made to operate as a single door for the storage compartment 267AD. For example, a connecting mechanism may be utilized to connect the doors 287A-287D together so that they move as a single door, the doors may all be included within a single larger door with separate hinges, or alternatively the doors 287A-287D may function independently but may be all operated so as to open at the same time for providing access to the storage compartment 267AD.

As an example of a larger door which includes smaller doors, a door 285 is shown to cover the entire front of the storage compartment module 209 and includes the smaller doors for each of the storage compartments 261, 263, 265 and 267AD. Each of the smaller doors are separately hinged and provide access to the respective storage compartments 261, 263, 265 and 267AD through respectively sized openings in the door 285. The door 285 is shown to be attached to the storage compartment module 209 by hinges 283, and when the door 285 is opened it provides access to the entire interior storage area of the storage compartment module 209. As will be described in more detail below, in various implementations partitions may be inserted and/or removed, wherein if all of the vertical and horizontal partitions between each of the storage compartments 261, 263, 265 and 267AD are removed, a storage compartment may be created that consists of the entire storage area of the storage compartment module 209. In various implementations, smaller versions of this principle and multiple layers of such doors may be provided. For example, in an alternative implementation, the door for the storage compartment 265 may be made as a smaller version of the door 285, including four smaller doors (not shown) which may provide access to four smaller storage compartments that may be formed by utilizing horizontal and/or vertical partitions to divide the storage compartment 265.

The storage compartment configuration 300B may be produced by modifying the storage compartment configuration 300A through a positioning (e.g., inserting, moving, etc.) of a set of partitions 297BC and 297CD to the illustrated locations so as to divide the larger storage compartment 267AD into smaller storage compartments 267AB, 267C and 267D. The storage compartment configuration 300B thus includes more storage compartments than the storage compartment configuration 300A. The storage compartment 267AB is approximately one-half of the size of the former storage compartment 267AD and is accessed by operating the doors 287A and 287B simultaneously. The storage compartments 267C and 267D are approximately one-quarter of the size of the former storage compartment 267AD, and are accessed by independently operating each of the doors 287C and 287D, respectively. An item 277AB, which is approximately one-half of the size of the item 277AD, is shown to be stored in the storage compartment 267AB. The storage compartments 267C and 267D may also receive one or more smaller items (not shown).

In various implementations, the modification from the storage compartment configuration 300A to the storage compartment configuration 300B may be planned based on a scheduled retrieval of the item 277AD and a scheduled delivery of the item 277AB and one or more smaller items. The positioning of the partitions 297BC and 297CD at the illustrated locations for forming the storage compartments 267AB, 267C and 267D of the respective sizes may be based on the sizes of the item 277AB and the one or more smaller items. As a result, the storage compartment configuration 300B may be determined to achieve a higher storage density than the storage compartment configuration 300A. More specifically, the storage of the item 277AB and the one or more smaller items in the respective storage compartments 267AB, 267C and 267D achieves a higher storage density than if the storage compartment 267AD was utilized to store only the item 277AB, and the one or more smaller items were not able to be stored due to a lack of additional storage compartments, or were stored in other additional storage compartments. Storage density for these purposes may in one example be defined as a ratio of an amount of used space (i.e., as occupied by items) to a total amount of space in each of the storage compartments in the storage compartment module. After the modification has been performed, the item 277AB and the one or more smaller items may each be associated with the respective storage compartments 267AB, 267C and 267D so that each of the items will be stored in the respective storage compartments when each of the items is delivered to the pickup location.

The storage compartment configuration 300C may be produced by modifying the storage compartment configuration 300B through a positioning (e.g., inserting, moving, etc.) of a partition 297AB to the illustrated location so as to divide the storage compartment 267AB into smaller storage compartments 267A and 267B. The storage compartment configuration 300C thus includes more storage compartments than the storage compartment configuration 300B. The storage compartments 267A-267D are approximately one-quarter the size of the former storage compartment 267AD, and are each accessed by independently operating the corresponding doors 287A-287D. The storage compartment 267A is shown to include a smaller item 277A, which is approximately one-half of the size of the item 277AB. The storage compartments 267B, 267C and 267D may also receive one or more smaller items (not shown). The one or more smaller items in the storage compartments 267C and 267D may be the same one or more smaller items that were previously stored in the storage compartment configuration 300B and which have not yet been retrieved.

In various implementations, the modification from the storage compartment configuration 300B to the storage compartment configuration 300C may be planned based on a scheduled retrieval of the item 277AB and a scheduled delivery of the item 277A and one or more smaller items. The positioning of the partition 297AB at the illustrated location for forming the storage compartments 267A and 267B of the respective sizes may be based on the sizes of the item 277A and the one or more smaller items. As a result, the storage compartment configuration 300C may be determined to achieve a higher storage density than the storage compartment configuration 300B. More specifically, the storage of the item 277A and the one or more smaller items in the respective storage compartments 267A and 267B achieves a higher storage density than if the storage compartment 267AB was utilized to store only the item 277A, and the additional storage compartment 267B was not available for storing the one or more smaller items as part of a separate user order. After the modification has been performed, the item 277A and the one or more smaller items may each be associated with the respective storage compartments 267A and 267B so that each of the items will be stored in the respective storage compartments when each of the items is delivered to the pickup location. It will be appreciated that the above described modification processes may also be performed in reverse when larger items are scheduled for delivery. For example, if the item 277AD is scheduled by itself for delivery with no smaller items, either the storage compartment configuration 300B or 300C may be modified by removing the respective partitions 297AB, 297BC and 297CD to produce the storage compartment configuration 300A.

In various implementations, data regarding the sizes of items to be delivered to a pickup location may be evaluated to determine possible alternative storage compartment configurations for storing the items. As part of the evaluation of the data, one of the alternative storage compartment configurations may be determined and/or selected for storing at least some of the items based on a sorting algorithm and/or a resulting storage density. For example, if the item 277AB was the only item that was scheduled for delivery, it may be determined that either of the storage compartment configurations 300A or 300B could be an alternative for storing the item, but that the storage compartment configuration 300C would not be an option due to not having a large enough storage compartment (i.e., assuming the storage compartments 261, 263 and 265 were full). In this scenario, the storage compartment configuration 300B may be selected due to achieving a higher storage density for the storing of item 277AB (i.e., the ratio of used space to total space in the storage compartment 267AB would be higher than that for storage compartment 267AD, with the storage density calculation potentially applying an equal or other weighting to each storage compartment). In various implementations, the storage density calculation may also utilize different weightings for different types of factors. For example, it may be determined to be preferable to utilize a pickup location to store multiple smaller items that are associated with multiple user orders rather than a single large item that is associated with a single user order. In such an implementation, an ability of a storage compartment configuration to store more incoming items that are associated with more user orders may be given a higher weight than another storage compartment configuration that is able to store one large ordered item, even if the resulting storage densities were approximately the same between the two storage compartment configurations.

As another example, if the items scheduled for delivery included the item 277AB and two smaller items, a sorting algorithm may be utilized to determine the different possibilities for storing the items in the storage compartment configurations 300A-300C. In this scenario, the sorting algorithm may determine that the storage compartment configuration 300A may store the item 277AB in the storage compartment 267AD, the storage compartment configuration 300C may store the two smaller items in the storage compartments 267A and 267B, and the storage compartment configuration 300B may store the item 277AB in the storage compartment 267AB and the smaller items in the storage compartments 267C and 267D. Based on these determinations, the storage compartment configuration 300B may be selected as the optimal choice, given the ability to store the most incoming items. As noted above, when multiple storage compartment configurations are able to store all of the items that are scheduled for delivery to a pickup location, a selection may also or alternatively be based on a highest achieved storage density (e.g., which may allow additional storage compartments to remain empty to allow future items to be received).

In various implementations, the control station 201 and/or storage compartment management component may be utilized for controlling the modifications to the storage compartment configurations through the positioning (e.g., inserting, moving, removing, etc.) of the partitions 297AB, 297BC and 297CD. For example, as illustrated in the storage compartment configuration 300C, partition positioning elements 293AB, 293BC and 293CD (rollers, gears, motors, actuators, etc.) may be provided in a modification components area 290 at the back of the storage compartment module 209. In various implementations, the modification components area 290 may alternatively or in addition be located on a side, top or bottom, or in an interior area, of the storage compartment modules. In various implementations, the partition positioning elements 293AB, 293BC and 293CD may be electronically controlled by the control station 201 and/or storage compartment management component for moving the partitions into or out of the illustrated locations. As another example, a partition positioning element may include a robotic arm (not shown) that may be located on the storage compartment module 209 (e.g., in the modification components area 290) and which may be utilized for positioning the partitions into or out of the illustrated locations.

As also illustrated in the storage compartment configuration 300C, partition guiding portions 291AB, 291BC and 291CD (e.g., slots, tracks, rails, grooves, pins, ledges, etc.) may be utilized for assisting with the guiding and/or securing of the partitions as they are moved into or out of the illustrated locations. In various implementations, once the partitions are positioned, they may be locked into the respective locations by the partition guiding portions 291, the partition positioning elements 293 and/or through the use of other components. In addition or as an alternative to the illustrated horizontal partitions 297AB, 297BC and 297CD being moved horizontally, the horizontal partitions may be raised or lowered vertically to the illustrated locations (e.g., from the bottom or top of the storage compartment module 209) for forming the storage compartments 267A-267D, or may be raised or lowered vertically to different locations so as to form different sized storage compartments than those illustrated.

In various implementations, the vertical movement of horizontal partitions may be achieved through the use of various types of partition positioning elements and/or guiding portions. For example, the partition positioning elements may include vertical linear actuators (e.g., located in the back, sides, etc. of the storage compartment module) that move the horizontal partitions vertically (e.g., utilizing designated vertical guiding portions such as rails, tracks, etc.). In such configurations, different types of horizontal partitions may be utilized (e.g., a partition consisting of a horizontal flat plate that is attached to an actuator on the back or sides). In various implementations, vertical partitions may also or alternatively be moved horizontally by utilizing similar components. For example, for the horizontal movement of vertical partitions, the partition positioning elements may include horizontal linear actuators (e.g., located in the back, top/bottom, etc. of the storage compartment module) that move the vertical partitions horizontally (e.g., utilizing designated horizontal guiding portions such as rails, tracks, etc.). In such configurations, different types of vertical partitions may be utilized (e.g., a partition consisting of a vertical flat plate that is attached to an actuator on the back or top/bottom).

In various implementations, the modification components area 290 and/or other areas within the storage compartment module 209 may also include a storage area for storing the partitions 297AB, 297BC and 297CD when not in use. For example, the partitions may be made of a flexible material and/or structure, which can be stored vertically, horizontally or in an otherwise compact configuration, before bending and/or being rolled or moved out horizontally or vertically from the modification components area 290 or other storage area by one or more respective partition positioning elements 293 and as guided and secured by the partition guiding portions 291. In various implementations, the partitions may include hinged or otherwise flexible portions (e.g., similar to those commonly utilized in garage doors and other structures), wherein the partitions may be moved or rolled from one orientation to another in between storage locations and respective locations in the storage compartments. For example, in such configurations the partitions may be stored in one orientation (e.g., vertical or horizontal), and may be moved or rolled (e.g., as guided by partition guiding portions) to be positioned in a different orientation (e.g., horizontal or vertical) in respective locations within the storage compartments. In various implementations, the partitions may also or alternatively include foldable/unfoldable and/or compressable/stretchable portions (e.g., similar to those commonly utilized in accordion blinds and other structures). For example, in such configurations the partitions may be folded and/or compressed when they are to be stored and may be unfolded and/or stretched to be moved into respective locations within the storage compartments. In an alternative implementation, the modification components area 290 may be made large enough to store relatively rigid partitions (e.g., flat plates) in a horizontal or vertical orientation (e.g., with the modification components area 290 thus having approximately the same depth as the storage compartments) for which the partitions may be rolled or moved backward and forward by the respective partition positioning elements 293 to be moved between the modification components area 290 and the storage compartments.

In various implementations, once a modification has been made to a storage compartment configuration, door operations that correspond to the modified positions of the partitions may be determined and stored in a memory (e.g., of the control station 201) so that the correct doors will be opened for providing access to the storage compartments. For example, if multiple doors are associated with a storage component, (e.g. storage compartment 267AD with doors 287A-287D or storage compartment 267AB with doors 287A and 287B), the multiple doors may be unlocked and/or opened simultaneously for providing access to the storage compartment. As another example, if larger doors are made to include smaller doors (e.g., such as the door 285), the respective door(s) that correspond in a particular configuration to a respective storage compartment may be opened to provide access to the respective storage compartment. In various implementations, larger and/or smaller doors may also be provided on an opposite side (e.g. on the back) of the pickup location. For example, another set of doors (not shown) may be provided on the back side of the storage compartment module 209, which may correspond to different sizes of storage compartments (e.g. smaller or larger storage compartments than those illustrated on the front side of the storage compartment module 209). In such an implementation, a user may be instructed to go to the doors on either the front side or the back side of the storage compartment module 209, depending on the size of the storage compartment that the user is to access.

It will be appreciated that in other implementations, different numbers or types of doors may be utilized for providing access to the storage compartments. For example, sliding doors (e.g., as driven by one or more motors or actuators) may be utilized for providing access to storage compartments of variable sizes. For example, if the storage compartment 267A was reduced to approximately one-half of its illustrated size (e.g., by moving the partition 297AB to a position half-way up), a pair of sliding doors that slide up and down (e.g., and which may be flexible for retracting into top and bottom portions of the storage compartment module 209) may be utilized for providing access to such variable sized storage compartments.

In various implementations, the doors may also be attached and/or operated in other manners. For example, with respect to the storage compartment configuration 300A, the door for the storage compartment 265 may be hinged on the opposite side (e.g. at the outside edge of the storage compartment module 209), so as to open in the opposite direction as the doors 287A-287D. In an implementation where a center divider and/or partition is removable, storage areas of the storage compartments 265 and 267AD may be combined so as to form a larger storage compartment consisting of the lower half of the storage compartment module 209. This example illustrates a utility of doors with hinges on opposite sides for providing access to larger storage compartments when a vertical partition is removed.

In various implementations, the storage compartment module 209 may also be expandable. For example, as illustrated in the storage compartment configuration 300C, the storage compartment module 209 includes an outer storage compartment wall 209W1 which is part of a configuration (e.g., including sliding panels, etc.) which may be expanded out so as to increase the overall width and corresponding volume occupied by the storage compartment module 209. In various implementations, such expansion may be utilized to increase the size of at least some of the storage compartments and/or may be utilized to increase the number of storage compartments. For example, the number of storage compartments may be increased if the movement of the outer storage compartment wall is done in conjunction with a positioning of one or more partitions and corresponding doors for creating additional storage compartments in the added space created by the movement of the wall.

FIG. 4 depicts a block diagram of an illustrative distributed pickup location environment 401 that includes a group of distributed pickup locations 200(A), 200(B), 200(C), 200(D), 200(E), in one implementation. A group of corresponding geographic ranges 400(A), 400(B), 400(C), 400(D), 400(E) are served by each pickup location 200(A)-200(E). Certain areas may be served by multiple pickup locations, such as the combined geographic range 400(AB) served by both of the pickup locations 200(A) and 200(B), the combined geographic range 400(BC) served by both of the pickup locations 200(B) and 200(C), the combined geographic range 400(CD) served by both of the pickup locations 200(C) and 200(D) and the combined geographic range 400(DE) served by both of the pickup locations 200(D) and 200(E). When an order for one or more items is placed by user, a shipment set may be assigned to a materials handling facility for fulfillment and delivery to the user. By strategically placing pickup locations 200, a user may select a pickup location, such as pickup location 200(A) that is in a geographically convenient location 400(A) as the delivery destination, rather than having the order delivered to their house, apartment, office or other location. This may be convenient to the user if they may not be available when the item would otherwise be delivered to the location, may not want others located at alternative delivery locations to know that they have ordered an item (e.g., a mother may not want a gift for their child delivered to the house) or may not want the item left at an unsecure location (e.g., front porch, mailroom) if they are not present when the item is delivered.

When a user places an order for one or more items, an order planning system may determine if there is a pickup location, such as pickup location 200(A), within a geographic range 400(A) of where the user may wish to have the items delivered. In some instances, a user may designate or preselect preferred pickup locations 200, such as pickup locations 200(A), 200(B). For example, a user may designate one pickup location 200(A) as a preferred pickup location near the user's home and a second pickup location 200(B) as a pickup location near the user's work. A user may also designate multiple pickup locations as being acceptable for delivery in case one pickup location is full, such as designating either of pickup locations 200(A) or 200(B) as being acceptable delivery locations near the user's home. If an identified pickup location is available, the order planning system may determine if it is currently indicated that there will be available capacity to receive the user's order prior to designating the pickup location for delivery of an order. For items that have been ordered with a pickup location 200 designated as the delivery location, the materials handling facility may prepare and ship the orders to each of those pickup locations, in some instances without requiring shipping packages for those orders, as described in more detail above with respect to FIG. 1. For example, orders assigned to pickup location 200(A) may be picked directly into one or more delivery containers, transported to the pickup location 200(A), placed in storage compartments of the pickup location 200(A) and made available for retrieval by the users.

In various implementations, the pickup locations 200(A), 200(B), 200(C), 200(D), 200(E) may communicate with one or more remote computing resources 410. The remote computing resources 410 may form a portion of a network-accessible computing platform implemented as a computing infrastructure of processors, storage, software, data access, and other components that is maintained and accessible via a network 408. The pickup locations 200(A), 200(B), 200(C), 200(D), 200(E) may communicatively couple to the remote computing resources 410 via the network 408 which may represent wired technologies (e.g., wires, USB, fiber optic cable, etc.), wireless technologies (e.g., RF, cellular, satellite, Bluetooth, etc.), and/or other connection technologies. The network 408 carries data between the pickup locations and the remote computing resources 410. For example, the communications to and from the pickup locations may utilize the main access point 232 and/or the wireless antennas of the pickup locations, such as the wireless antennas 241, 243, 231, 245, 247 described above with respect to FIG. 2. Communications may be to and from the command component of the control station for each of the pickup locations, such as the control station 201, and may also be to and from the storage compartment management components of each connected storage compartment module, such as the storage compartment modules 203, 205, 207, 209.

As illustrated, the remote computing resources 410 may include one or more servers, such as servers 420(1), 420(2), . . . , 420(N). These servers 420(1)-(N) may be arranged in any number of ways, such as server farms, stacks, and the like that are commonly used in data centers. Furthermore, the servers 420(1)-(N) may include one or more processors 422 and memory 424 which may store a storage compartment control system 426.

The storage compartment control system 426 may be configured, for example, to communicate with the pickup locations 200(A), 200(B), 200(C), 200(D), 200(E). In various implementations, the general activities of the pickup locations, including the management of the storage compartments and the related scheduling of deliveries and retrievals of items to and from the storage compartments, may be coordinated by the storage compartment control system 426. In various implementations, the storage compartment control system 426 and/or the control station 201 of the pickup location may also determine when a storage compartment configuration is to be modified. For example, as will be described in more detail below with respect to FIG. 6, data regarding currently scheduled deliveries and retrievals of items to and from a pickup location may be evaluated, and based on the sizes of the items a modification of the storage compartment configuration may be made (e.g., to increase the corresponding storage density).

Figure 5:
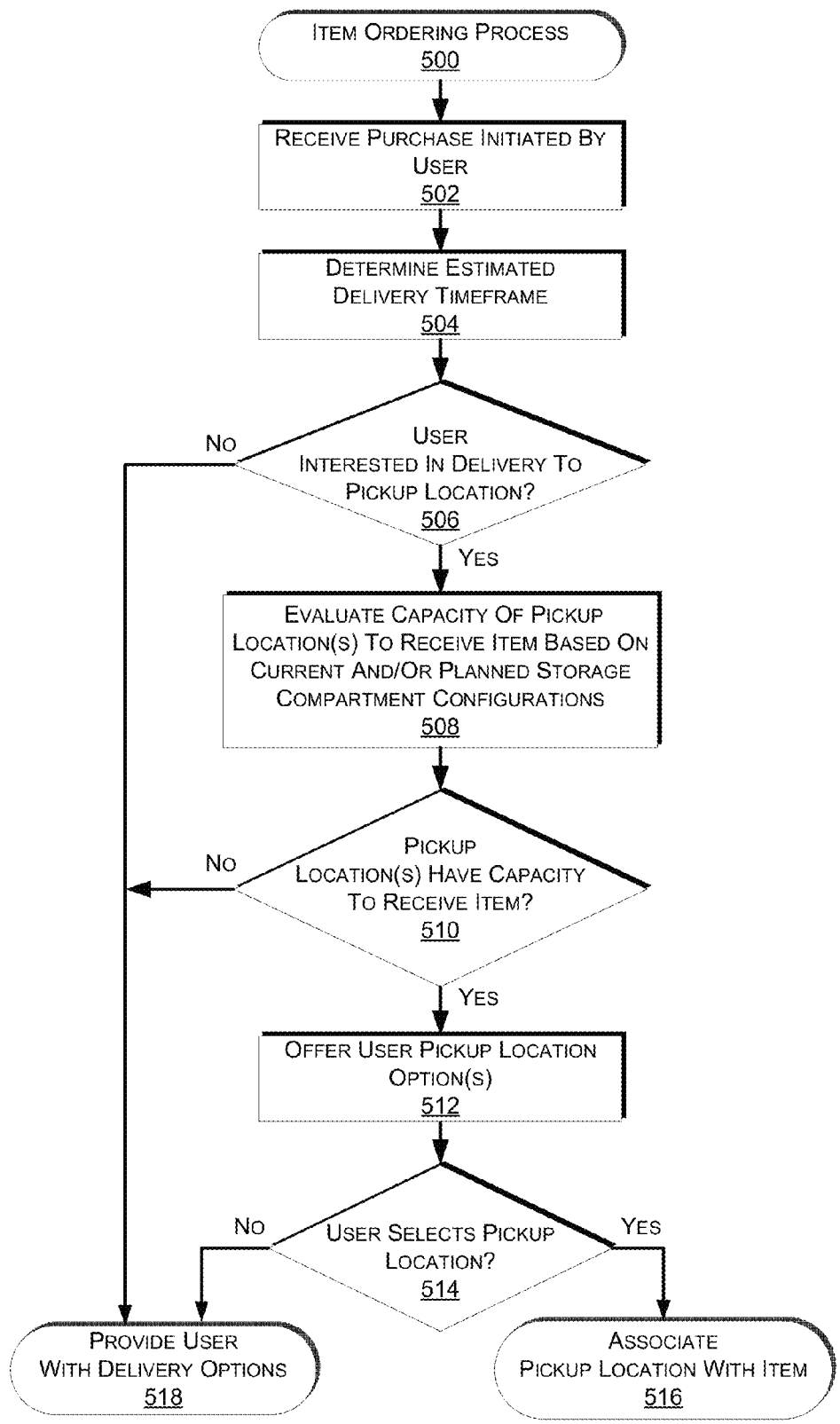
FIG. 5 is a flow diagram illustrating an example process for processing a user order for an item, according to some implementations.

FIG. 5 is a flow diagram illustrating an example process 500 for processing a user order for an item. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 500 begins with the receipt of a purchase request initiated by a user, as in 502. Upon receiving a purchase request for an item from a user, a determination is made as to the estimated delivery timeframe for that item, as in 504. In some examples, this may include identifying a materials handling facility with the requested item in stock and estimating the time required to fulfill the item to the user. In other implementations, the estimated delivery timeframe may be a set day from the date of the purchase request or a series of days. For example, a user may specify that the delivery timeframe is to be one day from the date of purchase request or between three and five days from the date of the purchase request. In still other implementations, the estimated delivery timeframe may be a set day of the week upon which the user has requested to have items delivered. For example, a user may preselect to have items ordered during the week delivered on Thursday of every week.

In addition to determining an estimated delivery timeframe, a determination is made as to whether the user is interested in retrieving the item from a pickup location, as in 506. Determining whether a user is interested in retrieving the item from a pickup location may be done, for example, by receiving an interaction from the user through a user interface selecting to pick up the item or otherwise retrieve the item from a pickup location. Alternatively, a user may preselect or provide a preference that they prefer to retrieve their items from pickup locations.

If it is determined that the user is interested in retrieving the item from a pickup location, one or more pickup locations are evaluated to determine if they have capacity to receive the item based on current and/or planned storage compartment configurations for the pickup locations, as in 508. In various implementations, a user may select or have previously designated one or more pickup locations to be evaluated, or the pickup locations may be evaluated based on being within a preferred area for the user. A preferred area may be, for example, a geographic area in which the user lives, works, or through which the user frequently travels/commutes. Determining a preferred area may be done by receiving information from the user as to their preferred areas, identifying preferred areas based on a user's past purchase and delivery history, based on a user's known or estimated location, based on an address entered by the user, and the like.

The capacity of a pickup location to receive the item may be based at least in part on the size of the item as compared to available storage compartments in a current and/or planned storage compartment configuration for the pickup location. As will be described in more detail below, in various implementations, a storage compartment configuration of a pickup location may be modified (e.g., to achieve a higher storage density for the pickup location). For example, when a larger storage compartment is available at a pickup location, if only a smaller storage compartment is needed for storing an item, a partition may be inserted so as to divide the larger storage compartment into smaller storage compartments. By utilizing the smaller storage compartments to store smaller items, more items from more user orders may be designated for delivery to the pickup location and the corresponding storage density may be increased. In various implementations, such modifications may be planned to occur at a later time (e.g., at a particular time of day when such modifications are scheduled to occur, after a currently stored item has been retrieved from a storage compartment, etc.). In such instances, the capacity of the pickup location that is evaluated may be based on a planned storage compartment configuration that is scheduled to be in effect at the time the ordered item is scheduled to be delivered to the pickup location.

Once the pickup locations have been evaluated based on current and/or planned storage compartment configurations, a determination is made as to whether any of the pickup locations will have capacity to receive the item, as in 510. If it is determined that one or more of the pickup locations will have capacity for receiving the item, the user is provided with options for selecting a pickup location, as in 512. In various implementations, the options that are provided to the user may include the different pickup locations that are available, as well as different possible delivery and/or retrieval timeframes for the available pickup locations. After the pickup location options are offered to the user, a determination is made as to whether the user has selected a pickup location for delivery of the item, as in 514. If the user has selected a pickup location for delivery of the item, the selected pickup location is associated with the item, as in 516.

If it is determined that the user is not interested in using a pickup location, as in 506, that no pickup locations have capacity to receive the item, as in 510, or that the user has not selected one of the available pickup locations, as in 514, the example process provides the user with other delivery options, as in 518. Other delivery options may include allowing the user to select an alternative delivery timeframe and/or area, schedule an unattended delivery, and the like. If the user selects an alternative delivery timeframe and/or area (e.g., wherein during a different delivery timeframe and/or in a different area one or more pickup locations may have capacity for receiving the item) the example process may return to decision block 506 and continue, otherwise the example process completes.

Figure 6:
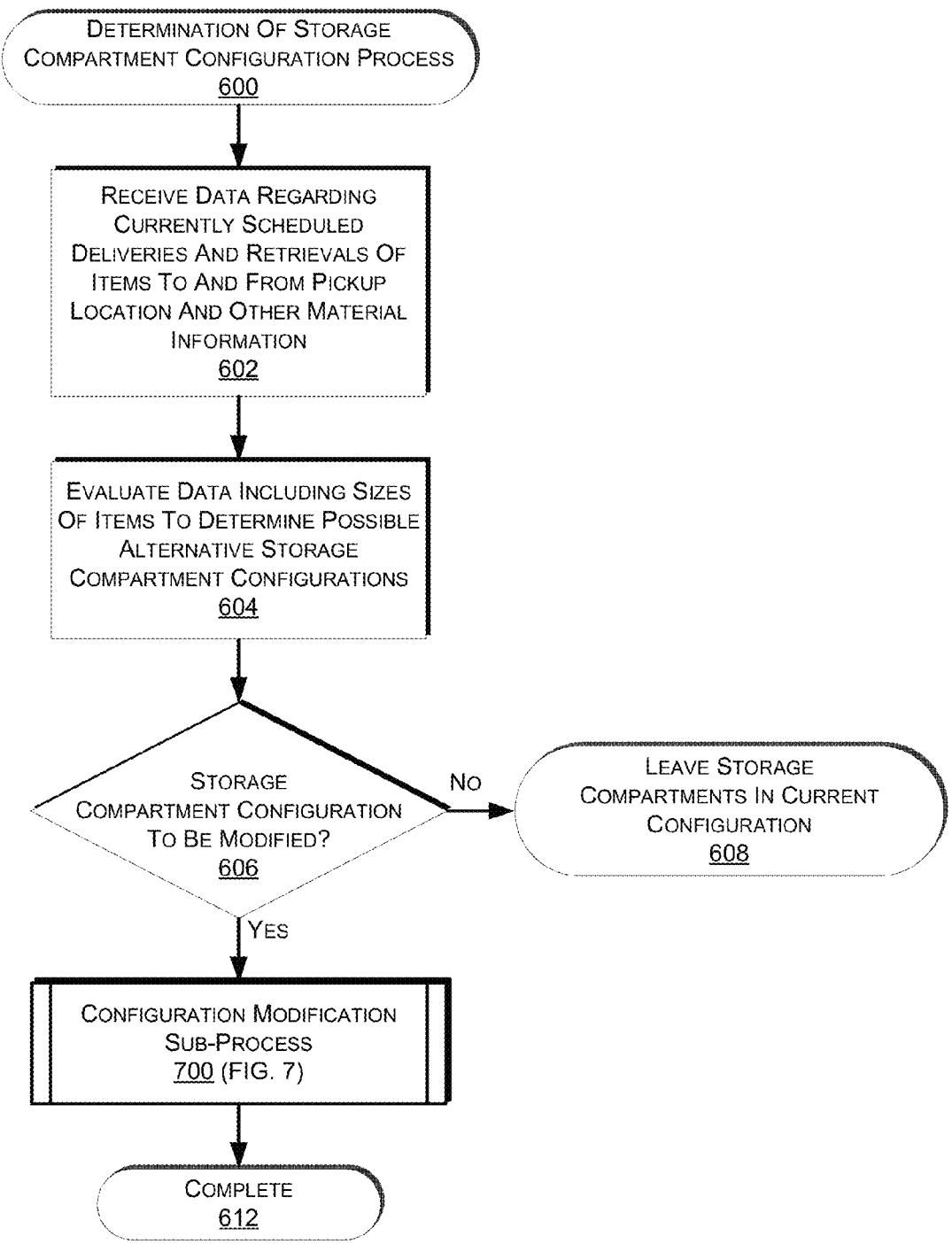
FIG. 6 is a flow diagram illustrating an example process for determining a storage compartment configuration in a pickup location, according to some implementations.

FIG. 6 is a flow diagram illustrating an example process 600 for determining a storage compartment configuration in a pickup location. The example process begins with a receipt of data regarding currently scheduled deliveries and retrievals for a pickup location, as well as other information that is material to a determination of a storage compartment configuration (e.g., the sizes of items to be stored, etc.), as in 602. Scheduled deliveries may include items that are currently in-transit, items that have been picked and/or packed but not yet departed from a materials handling facility, orders for items that have not yet been picked and/or packed and/or any order for an item. For example, the system may receive data from carriers, manufacturers, materials handling facilities and/or distributors identifying when items have and/or will be shipped and/or estimated delivery times for items that have been scheduled to be delivered to the pickup location. The system may also receive data regarding retrievals from a pickup location, as well as other material information. For example, data regarding an estimated time window for when a user will retrieve an item, as well as hours of operation for the pickup location, holidays, etc., may all be received.

In various implementations, other material information may be related to the sizes of the items, which may be utilized to determine sizes of storage compartments in which the items will be stored. In one example, data may be sent regarding the size of a shipping package which holds an item, and for which a storage compartment may be designated that has a sufficient size for holding the shipping package. Alternatively, data may be received regarding the size of the item without the shipping package, in which case if the item is delivered in a shipping package instructions may be provided to a carrier or other delivery entity for removing the item from the shipping package before it is placed in the storage compartment at the pickup location. Alternatively the pickup location itself may include capabilities (e.g., robotic, etc.) for removing an item from a shipping package before the item is placed in a storage compartment of the pickup location. As described above with respect to FIG. 1, for items delivered directly from a materials handling facility to a pickup location, the items may not need to be packed in shipping packages.

Once data regarding the currently scheduled deliveries and retrievals of items for the pickup location has been received, an evaluation of the data including the sizes of the items is performed to determine possible alternative storage compartment configurations that may be utilized for storing the items, as in 604. In various implementations, alternative storage compartment configurations may be available through a positioning of partitions, etc. For example, with respect to FIG. 3, the different storage compartment configurations 300A, 300B and 300C may each represent an alternative storage compartment configuration that is capable of storing certain items (e.g., the small item 277A). As part of the evaluation of the data, one of the alternative storage compartment configurations may be determined and/or selected for storing at least some of the items based on a sorting algorithm and/or a resulting storage density. For example, as described above with respect to the examples of FIG. 3, one of the storage compartment configurations may be selected based on a determination that the storage compartment configuration is able to hold the most items and/or achieve a higher storage density than the other alternative storage compartment configurations.

Once an evaluation of the data including the sizes of the items is performed to determine possible alternative storage compartment configurations, a determination is made as to whether the storage compartment configuration of the pickup location is to be modified, as in 606. For example, if the storage compartments are already in a configuration that has been determined and/or selected for storing the items, the storage compartment configuration may not be modified. As another example, if a modification would only achieve a marginal improvement (e.g., if an adjustment to a position of a partition would only result in a small increase in the storage density), the cost of the modification (e.g., in terms of time, disruption, energy, etc.) may be determined to be too high relative to the marginal improvement, in which case the modification may not be made. If the storage compartment configuration is not to be modified, the storage compartments are left in the current configuration, as in 608. If the storage compartment configuration is to be modified, a configuration modification sub-process is performed, as in 700, as will be described in more detail below with respect to FIG. 7. Once the configuration modification sub-process has been performed, the example process 600 completes, as in 612.

In various implementations, the modification of a storage compartment configuration may be performed during a particular time period. For example, the timing of the modifications may correspond to when the data is received (e.g., at the block 602), such as when the data is accumulated from an ordering system and provided a certain number of times per day (e.g., three times per day). In various implementations, the timing for the modification may also or alternatively be based at least in part on a timing for deliveries of items to and/or retrievals of items from a pickup location (e.g., so that the modifications will be completed before the items are delivered and/or after items are retrieved).

Figure 7:
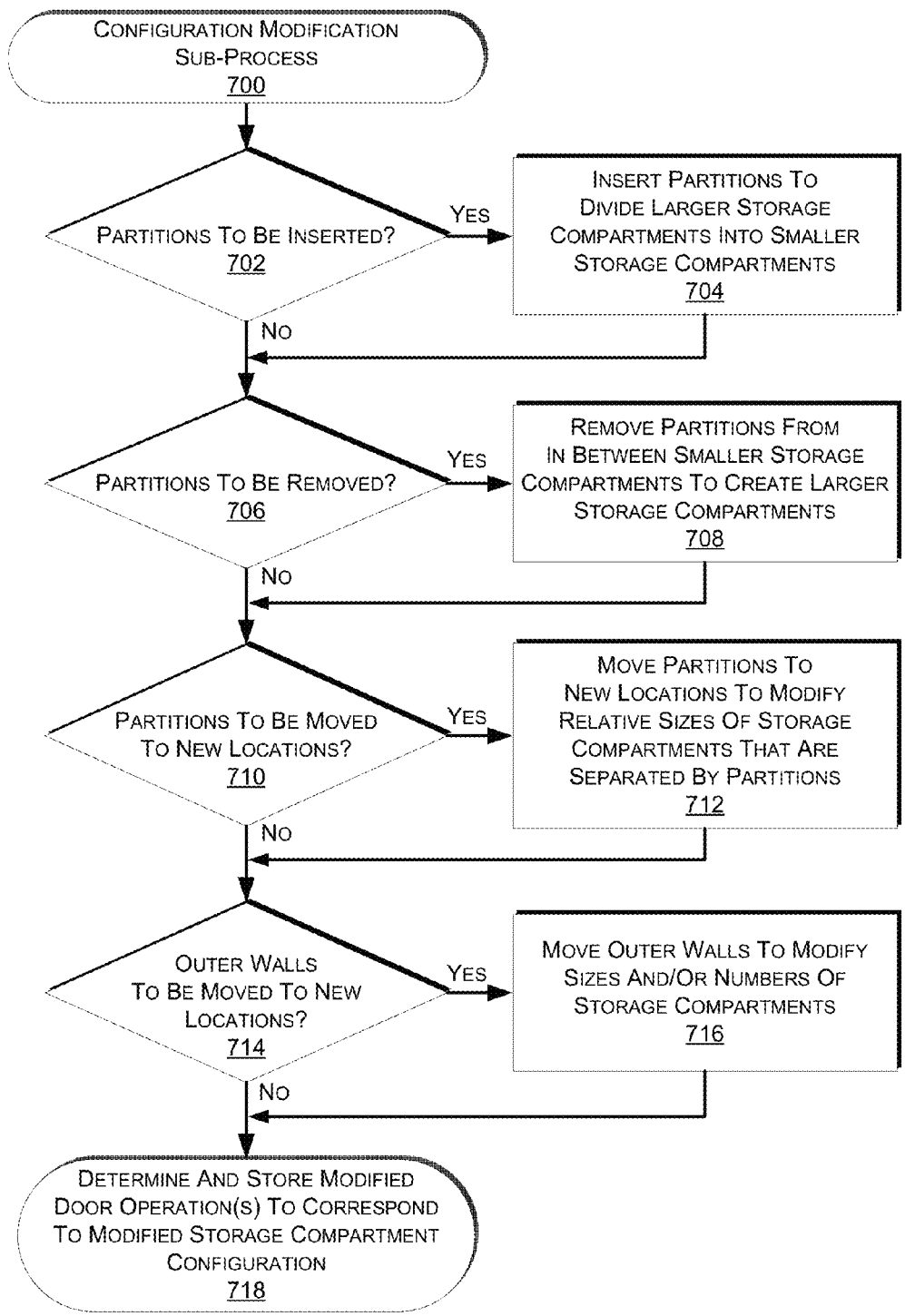
FIG. 7 is a flow diagram illustrating an example sub-process for modifying a storage compartment configuration, according to some implementations.

FIG. 7 is a flow diagram illustrating an example sub-process 700 for modifying a storage compartment configuration in a pickup location. The example sub-process begins with a determination as to whether one or more partitions are to be inserted, as in 702. If one or more partitions are to be inserted, the partitions are positioned at locations to divide larger storage compartments into smaller storage compartments, as in 704. In various implementations, partitions may be inserted by utilizing a partition positioning element of the pickup location, as described in more detail above with respect to FIG. 3. Once the one or more partitions have been inserted, as in 704, or if no partitions are to be inserted, as in 702, a determination is made as to whether any partitions are to be removed, as in 706. In various implementations, partitions may be removed by reversing the process that is utilized for inserting partitions (e.g., utilizing the partition positioning elements) as described above with respect to FIG. 3. If partitions are to be removed, the partitions are removed from in between smaller storage compartments so as to create larger storage compartments, as in 708.

Once the partitions have been removed, as in 708, or if no partitions are to be removed, as in 706, a determination is made as to whether any partitions are to be moved to new locations, as in 710. As described above with respect to FIG. 3, existing partitions that are oriented horizontally for separating storage compartments may be moved horizontally to new locations, and similarly, vertically oriented partitions may be moved vertically to new locations. If partitions are to be moved to new locations, the partitions are moved to modify the relative sizes of storage compartments that are separated by the partitions, as in 712.

Once the partitions have been moved to new locations, as in 712, or if no partitions are to be moved, as in 710, a determination is made as to whether any outer walls of the storage compartments are to be moved to new locations, as in 714. If any outer storage compartment walls are to be moved, the outer storage compartment walls are moved to new locations so as to modify the sizes and/or numbers of the storage compartments, as in 716. In various implementations, one or more of the outer storage compartment walls may be adjustable such that the overall volume that is occupied by the storage compartments may be made larger or smaller (e.g., as described above with respect to the outer storage compartment wall 209W1 of FIG. 3). With respect to the number of storage components, a movement of an outer storage compartment wall may be done in conjunction with the insertion or removal of partitions so as to increase or decrease the total number of storage compartments that are available for storing items.

Once the outer storage compartment walls have been moved, as in 716, or if no outer storage compartment walls are to be moved, as in 714, modified door operations that correspond to the modified storage compartment configuration are determined and stored, as in 718. In various implementations, the door operations may be determined according to the relative sizes of the storage compartments. For example, as described above with respect to FIG. 3, fixed doors may be utilized wherein one or more doors may be associated with a storage compartment depending on the size of the storage compartment. As another example, sliding doors may be utilized, wherein one or more sliding doors may be utilized to provide an opening of a size that corresponds to the size of the storage compartment.

Figure 8:
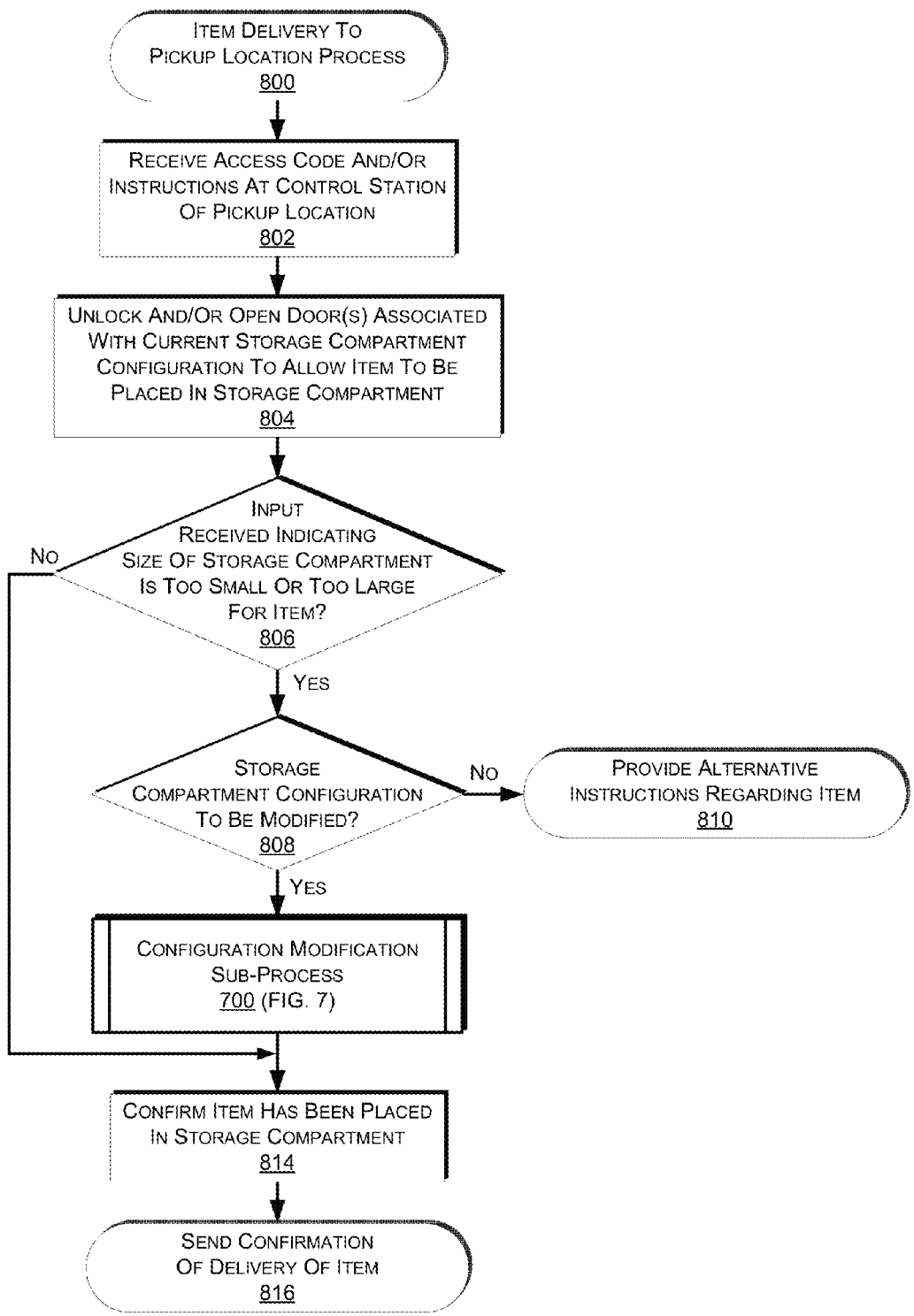
FIG. 8 is a flow diagram illustrating an example process for delivering an item to a pickup location, according to some implementations.

FIG. 8 is a flow diagram illustrating an example process 800 for delivering an item to a pickup location. In various implementations, items may be delivered to pickup locations by carriers, users, etc. For example, a carrier may deliver an item as part of a user order, a user may deliver an item as part of a return of the item, etc. The example process 800 begins with the receipt of an access code and/or instructions at a control station of the pickup location, as in 802. An access code may include a unique identifier, such as a PIN that may be input on a user interface of the control station and/or scanning of a barcode, QR code, etc. For example, an input may be received from a carrier or user that may include a tracking identification barcode, which may be scanned at the control station. As another example, an identification code may be entered on the user interface of the control station. In an alternative implementation, rather than an identification code being provided at the control station, the control station may receive an identification code or other instructions from a remote computing resource. For example, a carrier or user may be instructed to respond to a text message or perform another action with their cell phone or other mobile device when they are at the pickup location in order to have an identification code or other instructions sent from a remote computing resource to the control station.

Once the access code or other instructions are received, the door(s) associated with the storage compartment in the current storage compartment configuration is/are unlocked and/or opened, so as to allow the item to be placed in the storage compartment, as in 804. As discussed previously, a storage compartment may be opened by the command component of the control station 201 issuing an open storage compartment instruction to the storage compartment management component of a corresponding storage compartment module 203, 205, 207, 209 identifying the storage compartment that is to be opened in the current storage compartment configuration. The storage compartment management component, upon receipt of an open storage compartment instruction, may cause the lock(s) to disengage, thereby allowing and/or causing the door(s) that are associated with the identified storage compartment to open. In various implementations, different types of doors may be utilized that may be opened utilizing different mechanisms. For example, as described above with respect to FIG. 3, fixed doors on hinges may be utilized that swing open when unlocked. As another example, sliding doors may be utilized, which may be controlled to provide an opening that matches the size of the storage compartment that is to be accessed.

Once the doors are unlocked and/or opened, a determination is made as to whether an input is received indicating that the size of the storage compartment is too small or too large for the item, as in 806. In various implementations, various types of input may be received for determining that a storage compartment is too small or too large. For example, a carrier or user may provide feedback at the control station 201 indicating that an attempt was made to place the item in the storage compartment, but that the storage compartment was too small or too large. The feedback from the carrier or user may also specify whether it was the height and/or width of the item that did not match with the storage compartment. As another example, an image capture device or scanning device may be utilized for determining the size of an object, which may be compared to a size of a storage compartment to determine if the storage compartment is too small or too large for holding the item.

If it is determined that the storage compartment is too small or too large for the item, a determination is made as to whether the storage compartment configuration is to be modified, as in 808. For example, if another storage compartment is available at the pickup location for storing the item, a modification may not be required. As another example, the item may be so large that no modification is possible that would enable the item to be stored at the pickup location, in which case no modification may be attempted. If the storage compartment configuration is not to be modified, alternative instructions are provided regarding the item, as in 810. For example, a carrier or user may be instructed to place the item in a different storage compartment, to take the item to an alternative pickup location, etc. If the storage compartment configuration is to be modified, the configuration modification sub-process is performed, as in 700, as described above with respect to FIG. 7.

Once the storage compartment configuration has been modified so as to provide a storage compartment of sufficient size for storing the item, as in 700, or if the original size of the storage compartment or another storage compartment was sufficient, as in 806, a confirmation is made that the item has been placed in the storage compartment, as in 814. For example, the confirmation may include determining whether a closed-door notification has been received, as indicating that the door of the storage compartment has been closed after the item has been placed in the storage compartment. In addition, if an image capture device 273 within the storage compartment has been activated, video or images captured by the image capture device 273 may be reviewed or analyzed to confirm that the item has been placed in the storage compartment. In addition, or as an alternative thereto, a presence detection sensor 271 and/or motion sensor 272 within the storage compartment may be queried to confirm that the item has been placed in the storage compartment. Such confirmations may be desirable before a user or carrier is sent a notification that an item is available for retrieval.

Once a confirmation has been made that the item has been placed in the storage compartment, the control station of the pickup location and/or the user or carrier sends a confirmation of the delivery of the item, as in 816. The confirmation of the delivery may also include additional information such as the date and time of the delivery. In one implementation, the control station may send the delivery confirmation to a remote computing resource, which may then send a message to a user or carrier that the item has been delivered to the pickup location and is available for retrieval. In an alternative implementation, the delivery confirmation may be sent from the control station directly to the user or carrier. For example, the control station may send an electronic message, such as a text or email, which indicates that the item has been delivered to the pickup location and will be available for retrieval when the user or carrier reaches the pickup location.

In various implementations, a configuration modification sub-process 700 may alternatively be performed after the confirmation is made that the item has been placed in the storage compartment. For example, a determination may be made that the item is small enough such that a smaller storage compartment could be utilized for storing the item. In various implementations, the storage compartment configuration may be modified while the item is in the storage compartment, or may be modified while the item is temporarily removed from the storage compartment. For example, a robotic arm or other mechanism of the pickup location may be utilized for removing the item (e.g., from the back of the storage compartment) while the storage compartment configuration is modified. In another implementation, sensors within a storage compartment or other mechanisms may be utilized to determine a size and placement of the item within the storage compartment (e.g., as resting on the bottom of the storage compartment) for which a partition may be inserted (e.g., above the item) for dividing the storage compartment into smaller storage compartments. By allowing modifications to be made to the storage compartment configuration after items have been placed in the storage compartments, additional storage compartments and/or space within adjacent storage compartments may be made available for storing additional items that are to be delivered to the pickup location.

Figure 9:
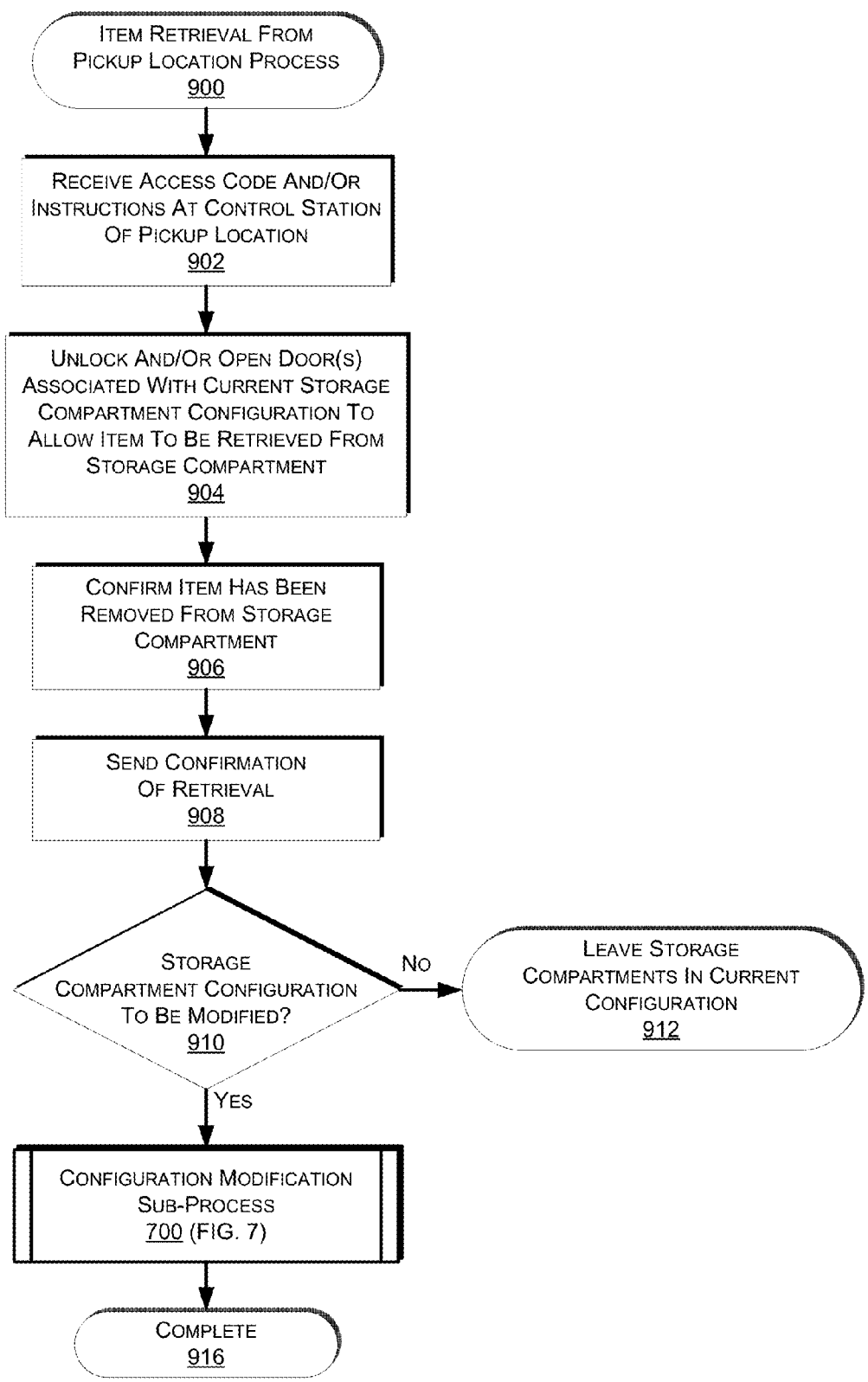
FIG. 9 is a flow diagram illustrating an example process for retrieving an item from a pickup location, according to some implementations.

FIG. 9 is a flow diagram illustrating an example process 900 for a retrieval of an item from a pickup location. In various implementations, items may be retrieved from pickup locations by users, carriers, etc. For example, a user may retrieve an item as a part of a user order, a carrier may retrieve an item as part of a return of the item or a subsequent or final delivery of the item, etc. The example process 900 begins with the receipt of an access code and/or instructions at a control station of the pickup location, as in 902. The access code and/or instructions may be similar to those described above with respect to block 802 of FIG. 8, and may have been provided to a user or carrier as part of a message indicating that the item is available to be retrieved from the pickup location. Once the access code or other instructions are received, the door(s) associated with the storage compartment of the current storage compartment configuration is/are unlocked and/or opened, so as to allow the item to be retrieved from the storage compartment, as in 904. The unlocking and/or opening of the door(s) may be similar to the procedures described above with respect to block 804 of FIG. 8.

Once the item has been retrieved, a confirmation is made that the item has been removed from the storage compartment, as in 906. For example, the confirmation may include determining whether a closed-door notification has been received, as indicating that the door of the storage compartment has been closed after the item has been retrieved. In addition, if an image capture device 273 within the storage compartment has been activated, video or images captured by the image capture device 273 may be reviewed or analyzed to confirm that the item has been removed from the storage compartment. In addition, or as an alternative thereto, a presence detection sensor 271 and/or motion sensor 272 within the storage compartment may be queried to confirm that the item has been removed from the storage compartment.

Once a confirmation has been made that the item has been removed from the storage compartment, the control station of the pickup location sends a confirmation of the retrieval to a remote computing resource, as in 908. The confirmation of the retrieval may also include additional information such as the date and time of the retrieval. In various implementations, a message may be sent to a user confirming the retrieval, as a safety measure. For example, the retrieval confirmation message may be sent to ensure that it was a user or a user's authorized agent and not another party that retrieved the item from the storage compartment.

Once a confirmation of the retrieval has been sent, a determination is made as to whether the storage compartment configuration is to be modified, as in 910. For example, once an item has been retrieved from a storage compartment, it may be desirable to insert one or more partitions for dividing the storage compartment into smaller storage compartments (e.g., so that additional smaller items that are in transit to the pickup location may be stored in the smaller storage compartments), or remove one or more partitions for combining the storage compartment with other storage compartments into larger storage compartments (e.g., so that additional larger items that are in transit to the pickup location may be stored in the larger storage compartments). If the storage compartment configuration is not to be modified, the storage compartments are left in the current configuration, as in 912. If the storage compartment configuration is to be modified, the configuration modification sub-process is performed, as in 700, as described above with respect to FIG. 7. Once configuration modification sub-process has been performed, the example process 900 completes, as in 916.

FIG. 10 is a block diagram illustrating an example computer system 1000 configured to implement one or more of the systems or processes described herein. In various examples, the block diagram may be illustrative of one or more aspects of the control station 201 (FIG. 2), the remote computing resource(s) 410 (FIG. 4), and/or other related computing systems. In the illustrated implementation, the computer system 1000 includes one or more processors 1010A, 1010B through 1010N, coupled to a non-transitory computer readable storage medium 1020 via an input/output (I/O) interface 1030. The computer system 1000 further includes a network interface 1040 coupled to an I/O interface 1030, and one or more input/output devices 1050. In some implementations, it is contemplated that components of a storage compartment control system and/or a pickup location (e.g., user interface, command component, storage compartment management component, control station) may be implemented using a single instance of the computer system 1000, while in other implementations, multiple such systems or multiple nodes making up the computer system 1000 may be configured to host different portions, components or instances of a storage compartment control system and/or pickup location. For example, in one implementation, some data sources or services (e.g., computing available space within a storage compartment, determining available storage capacity at the pickup location, determining a modification of a storage compartment configuration) may be implemented via one or more nodes of the computer system 1000 that are distinct from those nodes implementing other data sources or services (e.g., providing commands to open a storage compartment, managing available storage capacity at the pickup location, providing commands for positioning partitions to modify a storage compartment configuration). In some implementations, a given node may implement the functionality of more than one component of a storage compartment control system and/or a pickup location.

In various implementations, the computer system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer readable storage medium 1020 may be configured to store executable instructions and/or data accessible by the one or more processors 1010A-1010N. In various implementations, the non-transitory computer readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 1020 as program instructions 1025 and data storage 1035, respectively. In other implementations, program instructions and/or data may be received, sent or stored upon different types of computer-accessible media, such as non-transitory media, or on similar media separate from the non-transitory computer readable storage medium 1020 or the computer system 1000. Generally speaking, a non-transitory, computer readable storage medium may include storage media or memory media such as magnetic or optical media, e.g., disk or CD/DVD-ROM coupled to the computer system 1000 via the I/O interface 1030. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processors 1010A-1010N, the non-transitory computer readable storage medium 1020, and any peripheral devices in the device, such as the computer systems of the storage compartment modules, the network interface 1040 or other peripheral interfaces, such as input/output devices 1050. In some implementations, the I/O interface 1030 may perform any necessary protocol, timing or other data transformations to convert data signals from one component (e.g., non-transitory computer readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer readable storage medium 1020, may be incorporated directly into the processors 1010A-1010N.

The network interface 1040 may be configured to allow data to be exchanged between the computer system 1000 and other devices attached to a network, such as other computer systems, or between nodes of the computer system 1000. For example, the network interface 1040 may utilize the wireless antennas 241, 243, 231, 245, 247 to allow interaction and interface between the storage compartment control system 426 and the command component of the control station 201 and the storage compartment management component of each connected storage compartment module 203, 205, 207, 209. In various implementations, the network interface 1040 may support communication via wired or wireless general data networks, such as any suitable type of Ethernet network. For example, the network interface 1040 may support communication via telecommunications/telephony networks such as analog voice networks or digital fiber communications networks, via storage area networks such as Fibre Channel SANs, or via any other suitable type of network and/or protocol.

Input/output devices 1050 may, in some implementations, include one or more display terminals, keyboards, keypads, touchpads, scanning devices, voice or optical recognition devices, or any other devices suitable for entering or retrieving data by one or more computer systems 1000. Multiple input/output devices 1050, such as a user interface for the storage compartment control system 426 and/or the user interface 211, may be present in the computer system 1000 or may be distributed on various nodes of the computer system 1000. In some implementations, similar input/output devices may be separate from the computer system 1000 and may interact with one or more nodes of the computer system 1000 through a wired or wireless connection, such as over the network interface 1040. For example, the computer systems of the storage compartment modules 203, 205, 207, 209 and/or the locking mechanisms of those storage compartment modules may communicate with the computer system 1000 as input/output devices 1050 over wired or wireless network interface 1040.

As shown in FIG. 10, the memory 1020 may include program instructions 1025 which may be configured to implement a storage compartment control system and/or pickup location data storage 1035, which may comprise various tables, databases and/or other data structures accessible by the program instructions 1025. In one implementation, the program instructions 1025 may include various software modules configured to implement a user interface 211, security, locking and unlocking of storage compartments, management of the pickup location, and functions of the storage compartment control system 426, such as scheduling the delivery and retrieval of items, managing the available storage capacity of the pickup location and positioning partitions to modify a storage compartment configuration. The data storage 1035 may include various data stores for maintaining one or more storage compartment configurations, data representing presence or absence of items contained in various storage compartments, access information for various storage compartments and/or other item parameter values. The data storage 1035 may also include one or more data stores for maintaining data representing available storage capacity, item deliveries, retrievals, returns, hold orders, partial orders, transfer container locations, and other information utilized by the storage compartment control system and/or pickup location.

In various implementations, the parameter values and other data illustrated herein as being included in one or more data stores may be combined with other information not described or may be partitioned differently into more, fewer, or different data structures. In some implementations, data stores used in the storage compartment control system and/or in a pickup location and/or in components or portions thereof, may be physically located in one memory or may be distributed among two or more memories. These memories may be part of a single computer system or they may be distributed among two or more computer systems, such as two computer systems connected by a wired or wireless local area network, or through the Internet, in different implementations. Similarly, in other implementations, different software modules and data stores may make up a pickup location system and/or any of the various components thereof described herein.

Those skilled in the art will appreciate that the computing system 1000 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The computing system 1000 may also be connected to other devices that are not illustrated, or instead may operate as a stand-alone system. In addition, the functionality provided by the illustrated components may in some implementations be combined in fewer components or distributed in additional components. Similarly, in some implementations the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated computing system via inter-computer communication. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various implementations may further include receiving, sending or storing instructions and/or data implemented in accordance with the foregoing description upon a computer-accessible medium. Accordingly, the techniques described herein may be practiced with other computer system configurations.

Those skilled in the art will appreciate that in some implementations the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other implementations the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system for managing storage compartments at a pickup location, the system comprising:
   a pickup location, including:
   a plurality of storage compartments in a first storage compartment configuration that is modifiable to produce a second storage compartment configuration;
   a plurality of doors to provide access to storage compartments;
   at least one partition;
   at least one partition positioning element for positioning the at least one partition; and
   a modification components area for storing the at least one partition; and
   a computing system, including:
   a processor; and
   a memory coupled to the processor and storing program instructions that when executed by the processor cause the processor to at least:
   receive data regarding a plurality of items that are to be delivered to the pickup location, the data including a size for each of the plurality of items;
   determine that the first storage compartment configuration of the pickup location will be modified based at least in part on the size for each of the plurality of items;
   modify the first storage compartment configuration so as to produce the second storage compartment configuration, the second storage compartment configuration including a plurality of storage compartments for storing the plurality of items, wherein the modifying of the first storage compartment configuration includes controlling the at least one partition positioning element to position the at least one partition at a location to modify the first storage compartment configuration, and the at least one partition is stored in the modification components area when the at least one partition is not positioned at the location; and associate the plurality of items with the plurality of storage compartments so that each of the plurality of items will be stored in respective storage compartments when each of the plurality of items are delivered to the pickup location.

2. The system of claim 1, wherein the first storage compartment configuration includes a partition in a first location, and the modifying of the first storage compartment configuration further includes moving the partition to a second location that is different than the first location and which modifies a size of at least two storage compartments that are separated by the partition.

3. The system of claim 1, wherein the modifying of the first storage compartment configuration further includes moving at least one outer storage compartment wall so that the second storage compartment configuration occupies more volume than the first storage compartment configuration.

4. The system of claim 1, wherein the second storage compartment configuration includes more storage compartments than the first storage compartment configuration.

5. The system of claim 4, wherein the modifying of the first storage compartment configuration includes inserting the at least one partition to divide a larger storage compartment into smaller storage compartments that form part of the second storage compartment configuration.

6. The system of claim 5, wherein a plurality of doors that are operated simultaneously in the first storage compartment configuration to provide access to the larger storage compartment are each made to operate independently in the second storage compartment configuration to provide access to the respective smaller storage compartments.

7. A system for managing storage compartments at a pickup location, the system comprising:
    a pickup location, including:
        a plurality of storage compartments in a storage compartment configuration;
        a plurality of doors to provide access to storage compartments;
        at least one partition;
        at least one partition positioning element for positioning the at least one partition; and
        a modification components area for storing the at least one partition; and
    a computing system, including:
        a processor; and
        a memory coupled to the processor and storing program instructions that when executed by the processor cause the processor to at least:
            control the at least one partition positioning element to position the at least one partition at a location so as to modify the storage compartment configuration, wherein the at least one partition is stored in the modification components area when not positioned at the location.

8. The system of claim 7, wherein the at least one partition positioning element includes at least one of a roller, a motor, an actuator or a robotic arm.

9. The system of claim 7, wherein the pickup location further includes a control station which receives input from users of the pickup location and which controls the plurality of doors.

10. The system of claim 7, wherein the modification components area further includes the at least one partition positioning element.

11. The system of claim 7, wherein at least some of the plurality of doors comprise at least one of hinged doors or sliding doors.

12. The system of claim 7, wherein the pickup location further includes partition guiding portions for guiding the at least one partition into the location.

13. The system of claim 12, wherein the partition guiding portions include at least one of slots, tracks, rails, grooves, pins or ledges.

14. A system for managing storage compartments at a pickup location, the system comprising:
    a pickup location, including:
        a plurality of storage compartments in a storage compartment configuration;
        a plurality of doors to provide access to storage compartments;
        at least one partition;
        at least one partition positioning element for positioning the at least one partition; and
        a modification components area for storing the at least one partition; and
    a computing system, including:
        a processor; and
        a memory coupled to the processor and storing program instructions that when executed by the processor cause the processor to at least:
            receive data regarding a size of an item that is to be stored at the pickup location;
            determine, based at least in part on the size of the item, a size of a storage compartment for storing the item at the pickup location;
            determine a location where the at least one partition will be positioned for forming a storage compartment of the determined size that will store the item at the pickup location; and
            control the at least one partition positioning element to position the at least one partition at the location so as to modify the storage compartment configuration to form the storage compartment of the determined size that will store the item at the pickup location, wherein the at least one partition is stored in the modification components area when the at least one partition is not positioned at the location.

15. The system of claim 14, wherein the program instructions when executed by the one or more processors further cause the one or more processors to determine, based at least in part on the size of the storage compartment, at least one door operation for providing access to the storage compartment.

16. The system of claim 14, wherein the program instructions when executed by the one or more processors further cause the one or more processors to position the partition by at least one of inserting or moving the partition to the location for forming the storage compartment.

17. The system of claim 14, wherein the item is delivered to the pickup location inside a shipping package, and the program instructions when executed by the one or more processors further cause the one or more processors to provide instructions to remove the item from the shipping package before the item is placed in the storage compartment.

18. The system of claim 14, wherein the modification components area further includes the at least one partition positioning element.

19. The system of claim 14, wherein the program instructions when executed by the one or more processors further cause the one or more processors to:
receive data regarding a size of each of a plurality of items that are to be stored at the pickup location;
determine, based at least in part on the size of each of the plurality of items, sizes of storage compartments for storing the plurality of items at the pickup location; and
determine locations where partitions will be positioned for forming storage compartments of the determined sizes that will store the plurality of items at the pickup location.

20. The system of claim 19, wherein the determining of the sizes of the storage compartments includes evaluating different possible storage compartment configurations for the pickup location and selecting a storage compartment configuration that will achieve a highest storage density for storing the plurality of items at the pickup location.

\* \* \* \* \*